United States Patent
Lin

(10) Patent No.: US 10,054,148 B2
(45) Date of Patent: Aug. 21, 2018

(54) SCREW FOR AVOIDING CRACKS AND BURRS

(71) Applicant: KWANTEX RESEARCH INC., Tainan (TW)

(72) Inventor: Chao-Wei Lin, Tainan (TW)

(73) Assignee: Kwantex Research Inc., Tainan (TW)

( * ) Notice: Subject to any disclaimer, the term of this patent is extended or adjusted under 35 U.S.C. 154(b) by 221 days.

(21) Appl. No.: 14/927,637

(22) Filed: Oct. 30, 2015

(65) Prior Publication Data

US 2016/0265578 A1 Sep. 15, 2016

(30) Foreign Application Priority Data

Mar. 11, 2015 (TW) ................. 104107855 A

(51) Int. Cl.
*F16B 35/06* (2006.01)

(52) U.S. Cl.
CPC ................... *F16B 35/065* (2013.01)

(58) Field of Classification Search
CPC .................................................. F16B 35/065
USPC ......................................................... 411/399
See application file for complete search history.

(56) References Cited

U.S. PATENT DOCUMENTS

| | | | | |
|---|---|---|---|---|
| 1,238,636 A * | 8/1917 | Christofferson | ........ | F16B 35/06 411/399 |
| 3,255,797 A * | 6/1966 | Attwood | ............... | F16B 35/065 411/188 |
| 5,772,376 A * | 6/1998 | Konig | .................... | F16B 35/065 411/188 |
| 6,394,725 B1 | 5/2002 | Dicke | | |
| 7,293,947 B2 * | 11/2007 | Craven | ................. | F16B 35/065 411/387.2 |
| 7,604,445 B1 | 10/2009 | Dicke | | |
| 8,348,575 B2 * | 1/2013 | Walther | ............... | F16B 25/0015 411/399 |
| 9,482,258 B2 * | 11/2016 | Park | .................... | F16B 25/0036 |
| 2005/0226701 A1 | 10/2005 | Craven | | |
| 2007/0224020 A1 * | 9/2007 | Hsieh | ...................... | F16B 35/06 411/399 |
| 2013/0022426 A1 | 1/2013 | Wu | | |
| 2015/0063947 A1 * | 3/2015 | Huang | ................... | F16B 35/065 411/393 |

FOREIGN PATENT DOCUMENTS

| | | |
|---|---|---|
| DE | 29903232 U1 | 7/2000 |
| DE | 202011100595 U1 | 7/2011 |
| GB | 2336415 A | 10/1999 |
| JP | S49-143675 U | 12/1974 |
| JP | H05-71522 A | 3/1993 |
| JP | H05-157107 A | 6/1993 |

(Continued)

*Primary Examiner* — Flemming Saether
(74) *Attorney, Agent, or Firm* — Rosenberg, Klein & Lee

(57) ABSTRACT

A screw according to the present disclosure includes a head, a shank, a thread, a plurality of first ribs and at least one second rib. The thread is formed on the shank. The head is formed at one end of the shank and is configured to receive a fastening tool. The head is of tapered shape and has tapered side-surfaces, which include a first side surface and a second side surface. The second side surface is located between the first side surface and the shank. The first ribs are positioned on the first side surface. The second rib is positioned on the second side surface.

13 Claims, 28 Drawing Sheets

(56) References Cited

FOREIGN PATENT DOCUMENTS

| | | |
|---|---|---|
| JP | H06-18708 U | 3/1994 |
| JP | 2003-306978 A | 10/2003 |
| JP | 4779006 B2 * | 9/2011 |
| JP | 3187217 U | 11/2013 |
| TW | M410803 U | 9/2011 |
| TW | M43787 U | 12/2012 |
| WO | 85/05415 A1 | 12/1985 |

* cited by examiner

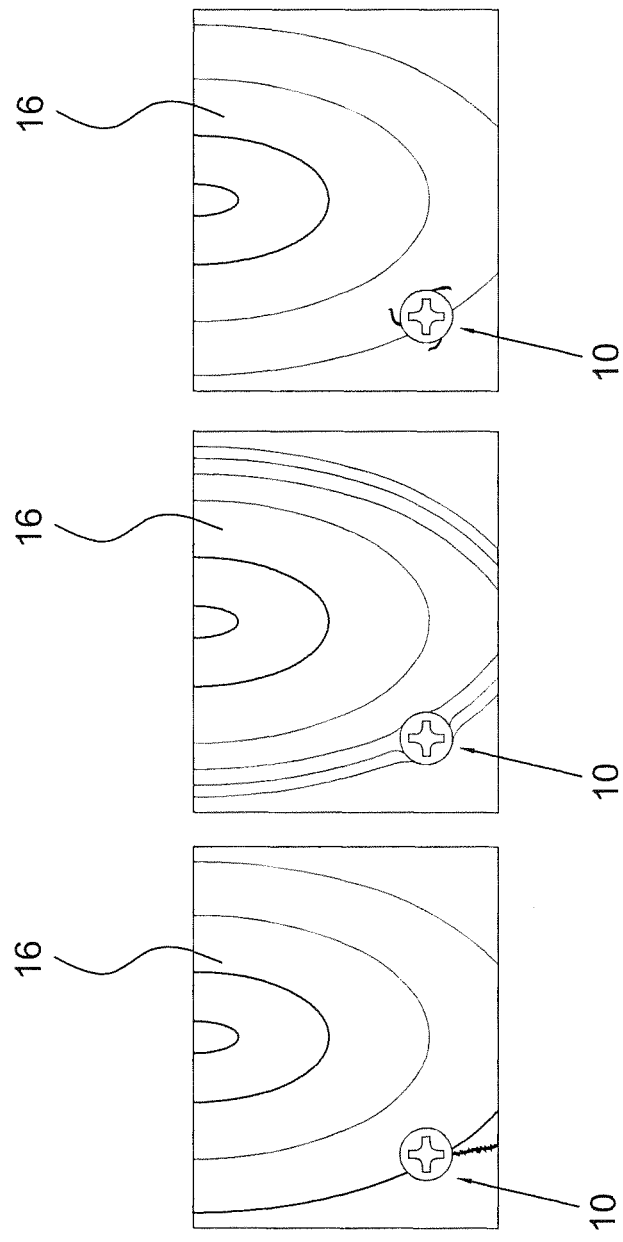

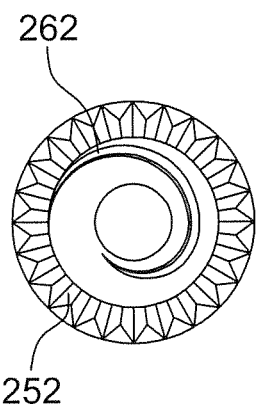
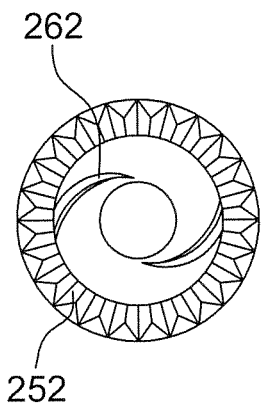
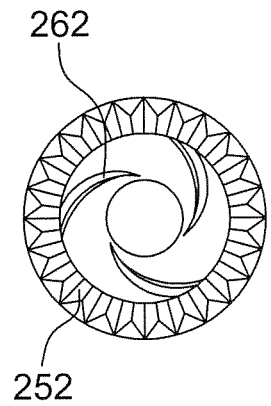
FIG. 5a    FIG. 5b    FIG. 5c
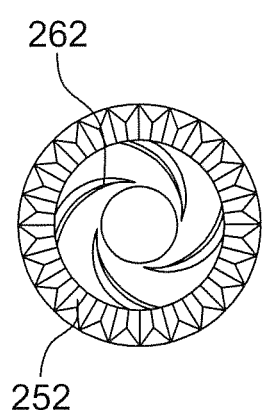
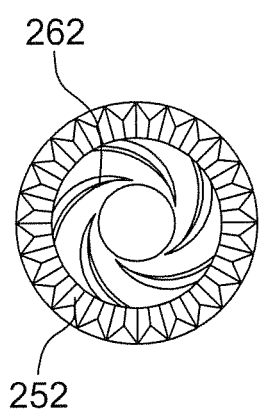
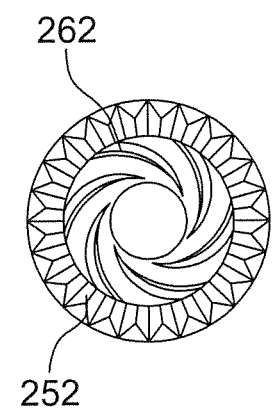
FIG. 5d    FIG. 5e    FIG. 5f

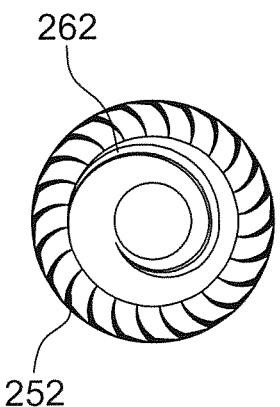
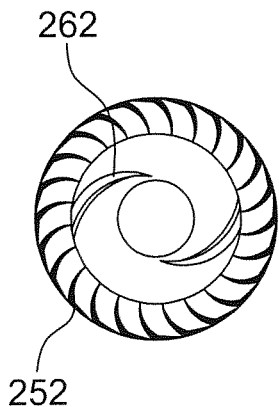
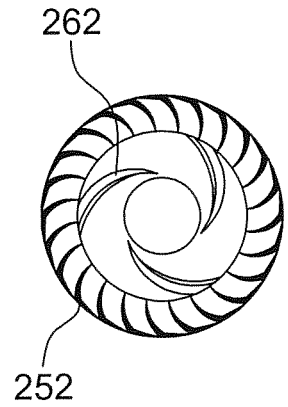
FIG. 12a    FIG. 12b    FIG. 12c
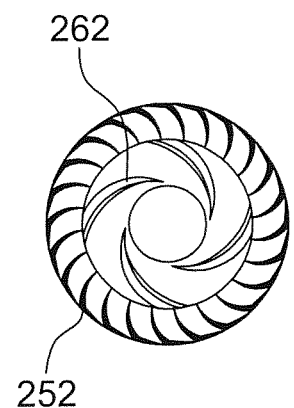
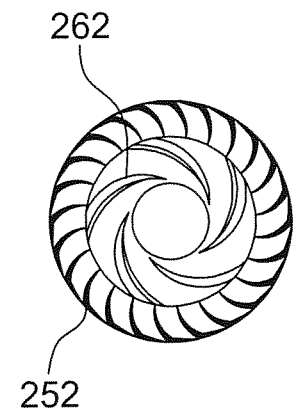
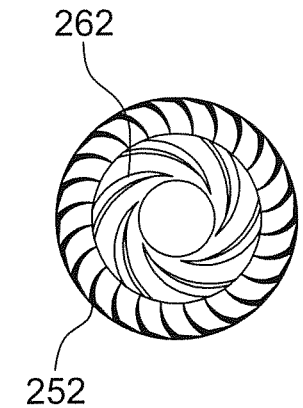
FIG. 12d    FIG. 12e    FIG. 12f

SCREW FOR AVOIDING CRACKS AND BURRS

RELATED APPLICATION

The present application is based on and claims priority to Taiwanese Application Number 104107855, filed Mar. 11, 2015, the disclosure of which is hereby incorporated by reference herein in its entirety.

BACKGROUND

1. Technical Field

The present invention relates to a screw, and more particularly, to a screw having improvements in screw head.

2. Description of the Related Art

Reference is made to FIGS. 1 and 2, which illustrate a conventional flat head screw 10 having cutting ribs. The flat head screw 10 includes a shank 11 and a flat head 12 with a conical shape. The shank 11 connects with the head 12 at one end and gets tapered at the other end. Four cutting ribs 13 are equally positioned on the conical side-surface 15 of the head 12 in longitudinal directions. Reference is now made to FIG. 3a, which illustrates that two pieces of plates 16, 18 made of wood, acrylic or plastics are fastened together by the screw 10. For illustration purpose, the plates 16 and 18 illustrated in FIG. 3a are two pieces of wood. The wood 16 stacks up on the wood 18 and the screw 10 is driven to first drill the wood 16. The screw 10 will drill through the wood 16 to wood 18. The four cutting ribs 13 will cut the wood 16 and finally the head 12 is countersunk into the wood 16 when the screw 10 continues to be drilled. This way the screw 10 fastens the woods 16 and 18 together.

However, the above conventional screw 10 has drawbacks as follows: First, the four cutting ribs 13 at the head 12 are curved and therefore have poor performance in cutting. This causes the head 12 hard to be countersunk into the wood 16 and it is required to use a larger torque to drill the woods accordingly. Secondly, since the four cutting ribs 13 are positioned on the conical side-surface 15 of the head 12 in the longitudinal directions, it causes the cutting ribs 13 poor performance in cutting. This renders the screw 10 not suitable for fastening a hard workpiece. Finally, since the four cutting ribs 13 are curved and positioned on the conical side-surface 15 of the head 12 in the longitudinal directions, it often causes the wood grain to be twisted surrounding the head 12 when the head 12 is countersunk into the wood 16 that is a hard wood having hard fibers or is a complicated compound wood. In addition, it may also cause the wood 16 to be cracked, have burrs or form a bulge 14 surrounding the countersunk head 12. Reference is now made to FIGS. 3b, 3c and 3d, which respectively illustrate the wood 16 has cracks, twisted grains and burrs surrounding the head 12 of the conventional screw 10 when the head 12 is countersunk into the wood 16.

In order to solve the above-mentioned problems and ensure the head 12 of the screw 10 to be countersunk into the wood 16 completely, it is common to suggest pre-drilling a hole in the wood 16 before fastening the screw 10 to the wood 16. The pre-drilling may be carried out by using a drilling tool with blades. The drilling tool may drill an enlarged hole by its blades on the upper surface of the wood 16. When the screw 10 is fastened to the wood 16 through the enlarged hole, the enlarged hole may receive the head 12 of the screw 10. This way the above-mentioned problems may be solved. However, it is troublesome to pre-drill an enlarged hole with a drilling tool.

Accordingly, there exists a need to provide a solution to solve the aforesaid problems.

SUMMARY

The present disclosure provides a screw in order to solve the aforesaid problems.

In one embodiment, the screw of the present disclosure includes a head, a shank, a thread, a plurality of first ribs and at least one second rib. The thread is formed on the shank. The head is formed at one end of the shank and is configured to receive a fastening tool. The head is of tapered shape and has tapered side surfaces, which include a first side surface and a second side surface. The second side surface is located between the first side surface and the shank. The first ribs are positioned on the first side surface. The second rib is positioned on the second side surface.

According to the screws of the present disclosure, both the ribs on the first and second side surfaces may cut the workpiece. In addition, the first ribs may also press the bulges and the chips cut from the workpiece in the workpiece. Therefore, the workpiece to be fastened will not exhibit evident bulges, cracks, burrs or twisted grains surrounding the screw heads when the screw heads are countersunk into the workpiece. The screws of the present disclosure may also prevent the fastened workpiece from cracking arising from stress concentration and climate influences such as thermal expansion and contraction, moisture absorption, and drying after moisture absorption when the screws have been fastened to the workpiece for a long time. The screws of the present disclosure may fasten the workpiece securely and be used safely, as well as keep the workpiece good appearance accordingly.

The foregoing, as well as additional objects, features and advantages of the disclosure will be more readily apparent from the following detailed description, which proceeds with reference to the accompanying drawings.

BRIEF DESCRIPTION OF THE DRAWINGS

FIG. 3b illustrates that the wood has cracks surrounding the head of the conventional flat head screw of FIG. 1 when the screw head is countersunk into the wood.

FIG. 3c illustrates that the wood grain is twisted surrounding the head of the conventional flat head screw of FIG. 1 when the screw head is countersunk into the wood.

FIG. 3d illustrates that the wood has burrs surrounding the head of the conventional flat head screw of FIG. 1 when the screw head is countersunk into the wood.

FIGS. 5a to 5f are cross-sectional views taken along line 5-5 of FIG. 4a or 4b, which illustrate that the head may have different number of second ribs formed thereon.

FIGS. 12a to 12f are cross-sectional views taken along line 12-12 of FIG. 11a or 11b, which illustrate that the head may have different number of second ribs formed thereon.

DETAILED DESCRIPTION OF THE PREFERRED EMBODIMENT

Figure 1:
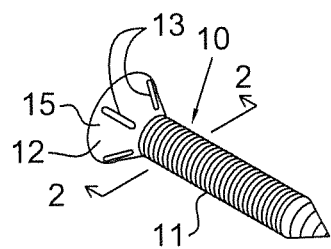
FIG. 1 is an elevated perspective view of a conventional flat head screw having cutting ribs.
Figure 2:
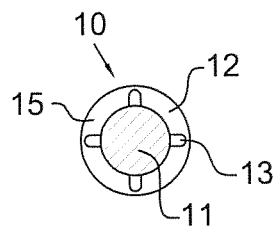
FIG. 2 is a cross-sectional view taken along line 2-2 of FIG. 1.
Figure 3A:
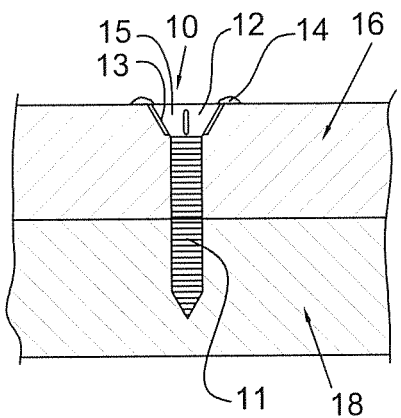
FIG. 3a illustrates that the conventional flat head screw of FIG. 1 is used to fasten two pieces of wood together.
Figures 4A, 4B:
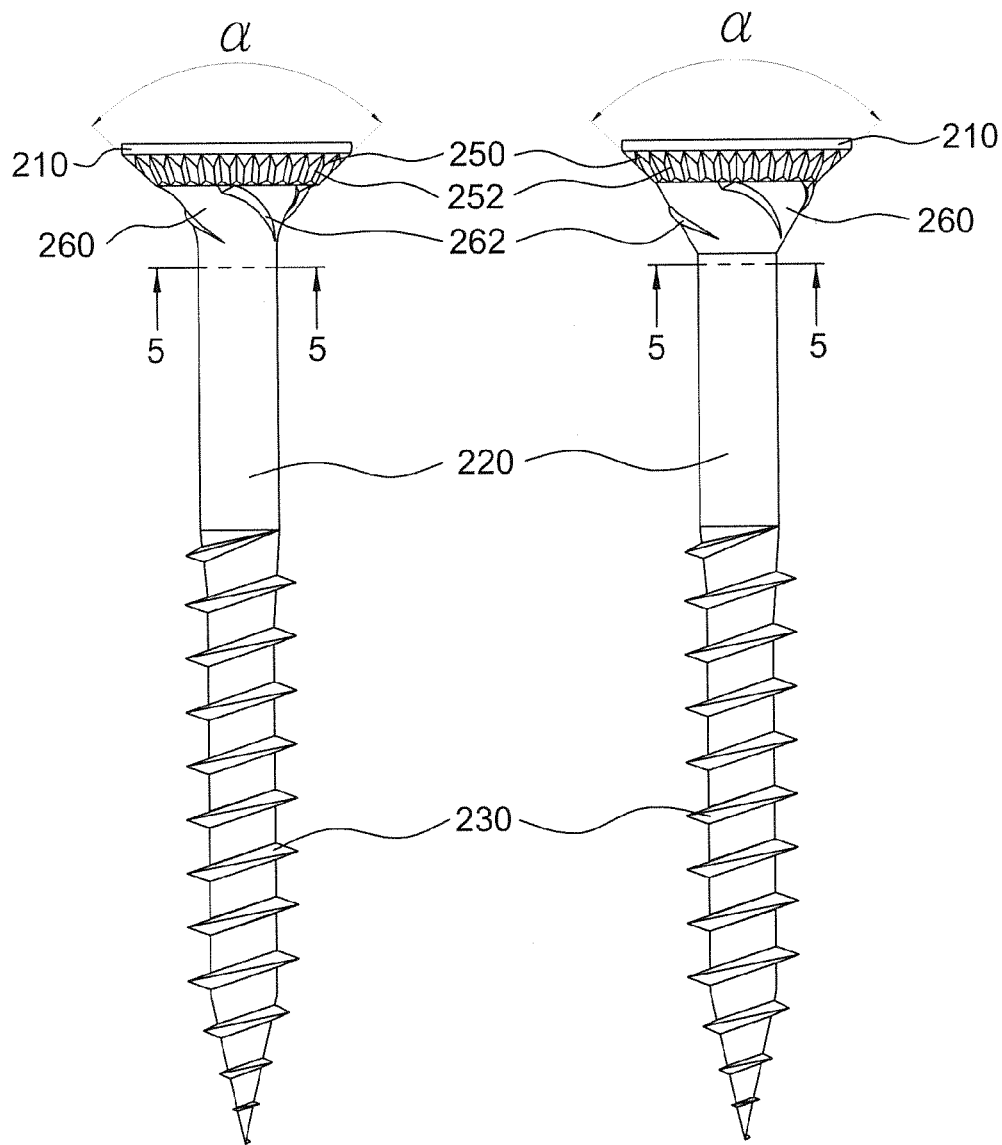
FIG. 4a is a front view of the screw of the present disclosure according to one aspect of the first embodiment.
FIG. 4b is a front view of the screw of the present disclosure according to another aspect of the first embodiment.
Figures 6A, 6B:
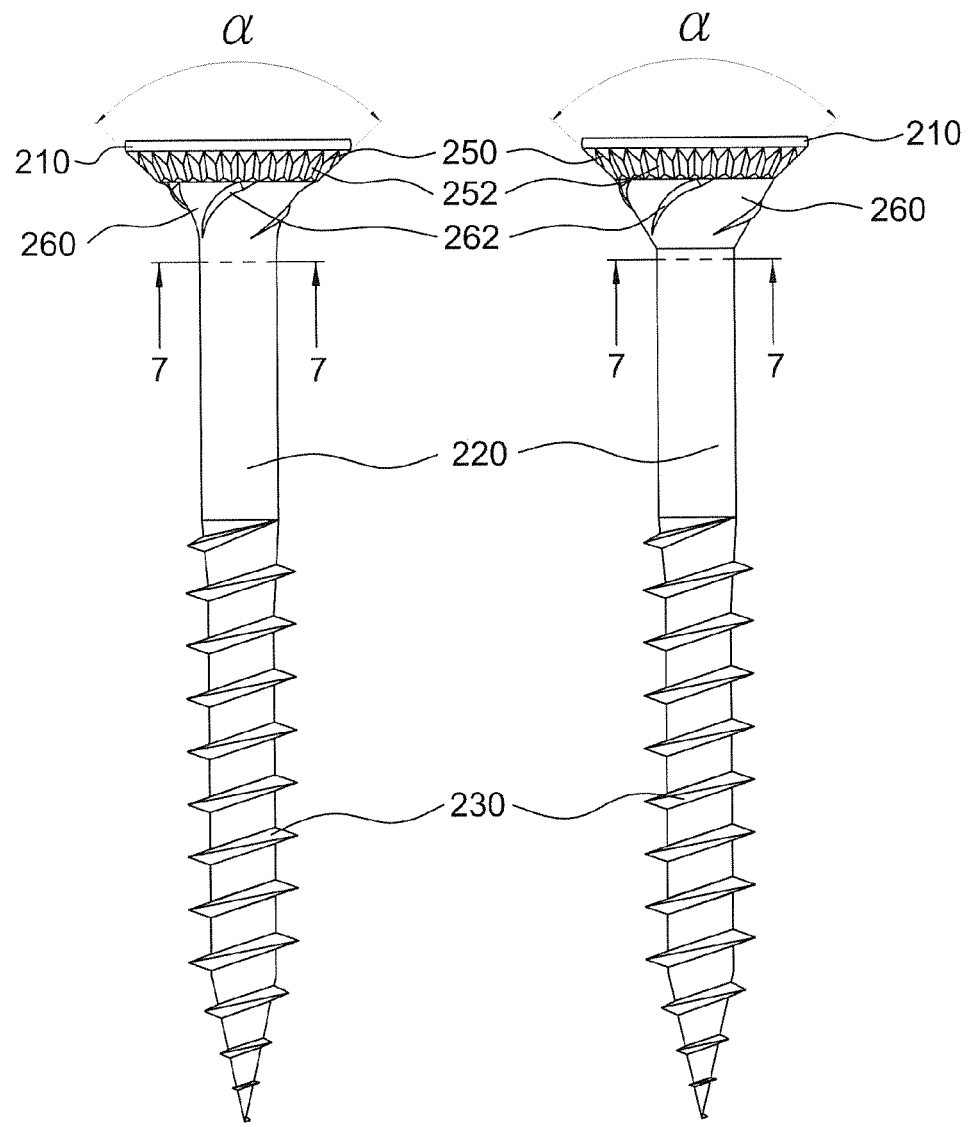
FIG. 6a is a front view of the screw of the present disclosure according to one aspect of the second embodiment.
FIG. 6b is a front view of the screw of the present disclosure according to another aspect of the second embodiment.
Figure 7A:
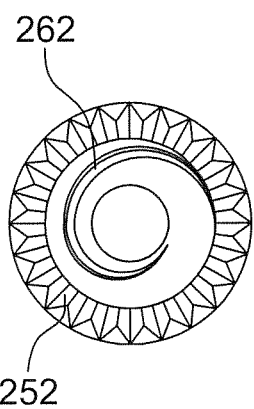
FIGS. 7a to 7f are cross-sectional views taken along line 7-7 of FIG. 6a or 6b, which illustrate that the head may have different number of second ribs formed thereon.
Figure 7B:
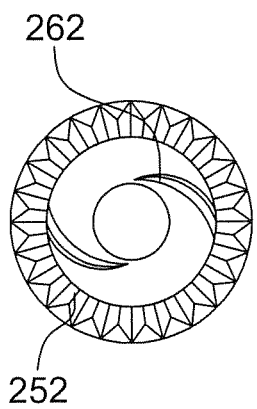
Figure 7C:
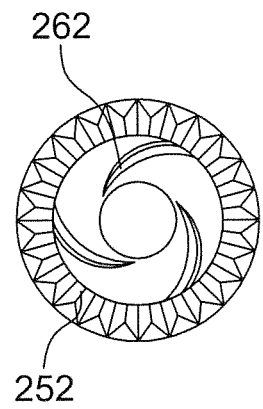
Figure 7D:
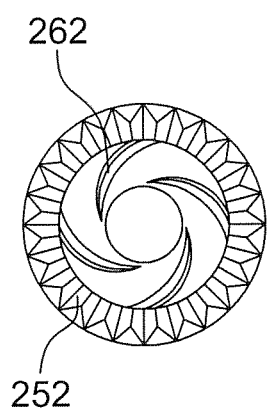
Figure 7E:
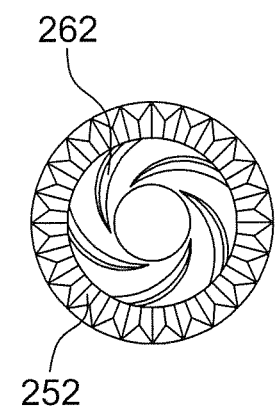
Figure 7F:
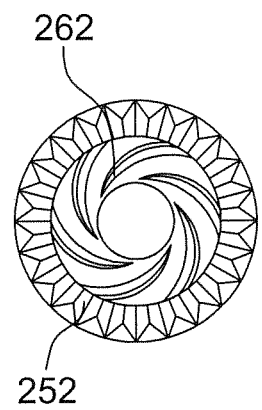
Figures 8A, 8B:
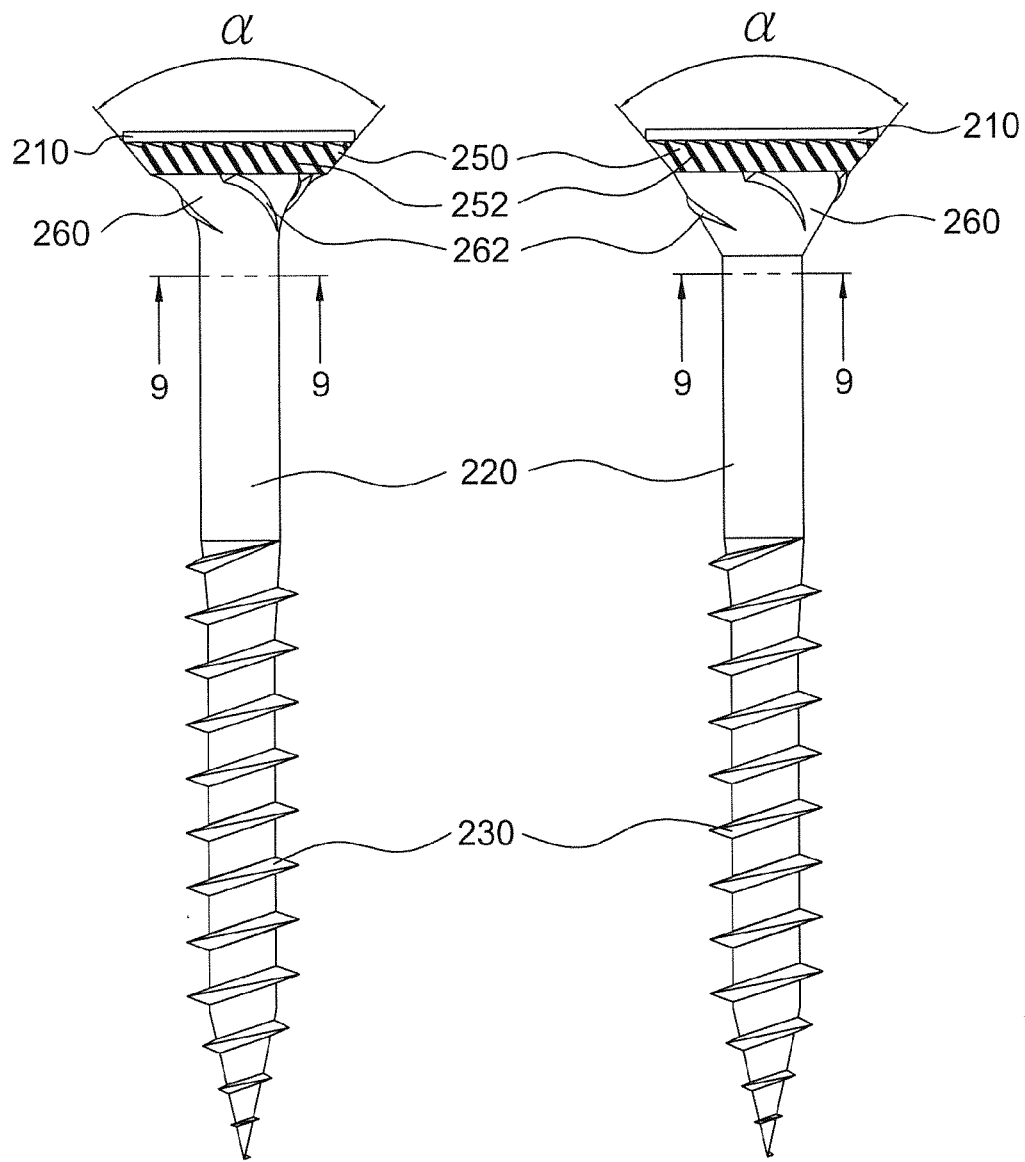
FIG. 8a is a front view of the screw of the present disclosure according to one aspect of the third embodiment.
FIG. 8b is a front view of the screw of the present disclosure according to another aspect of the third embodiment.
Figure 9A:
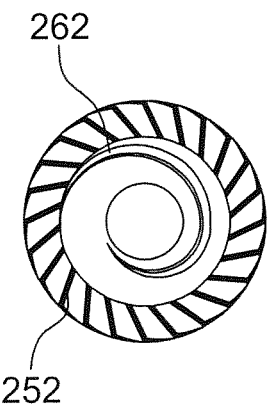
FIGS. 9a to 9f are cross-sectional views taken along line 9-9 of FIG. 8a or 8b, which illustrate that the head may have different number of second ribs formed thereon.
Figure 9B:
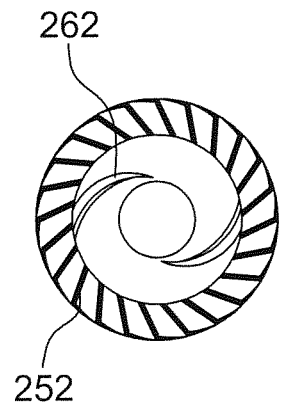
Figure 9C:
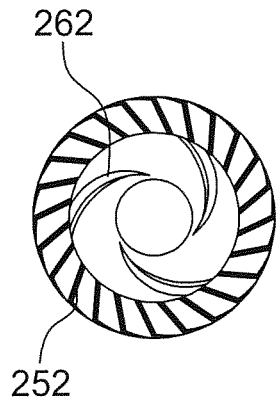
Figure 9D:
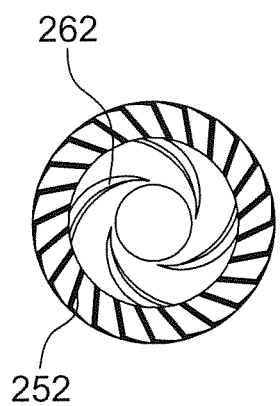
Figure 9E:
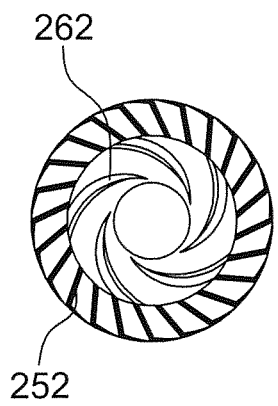
Figure 9F:
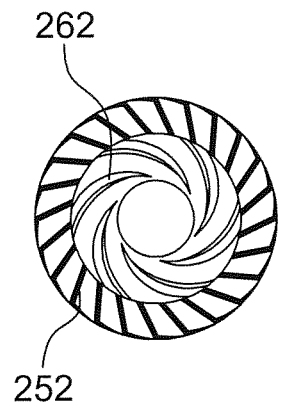
Figures 10A, 10B:
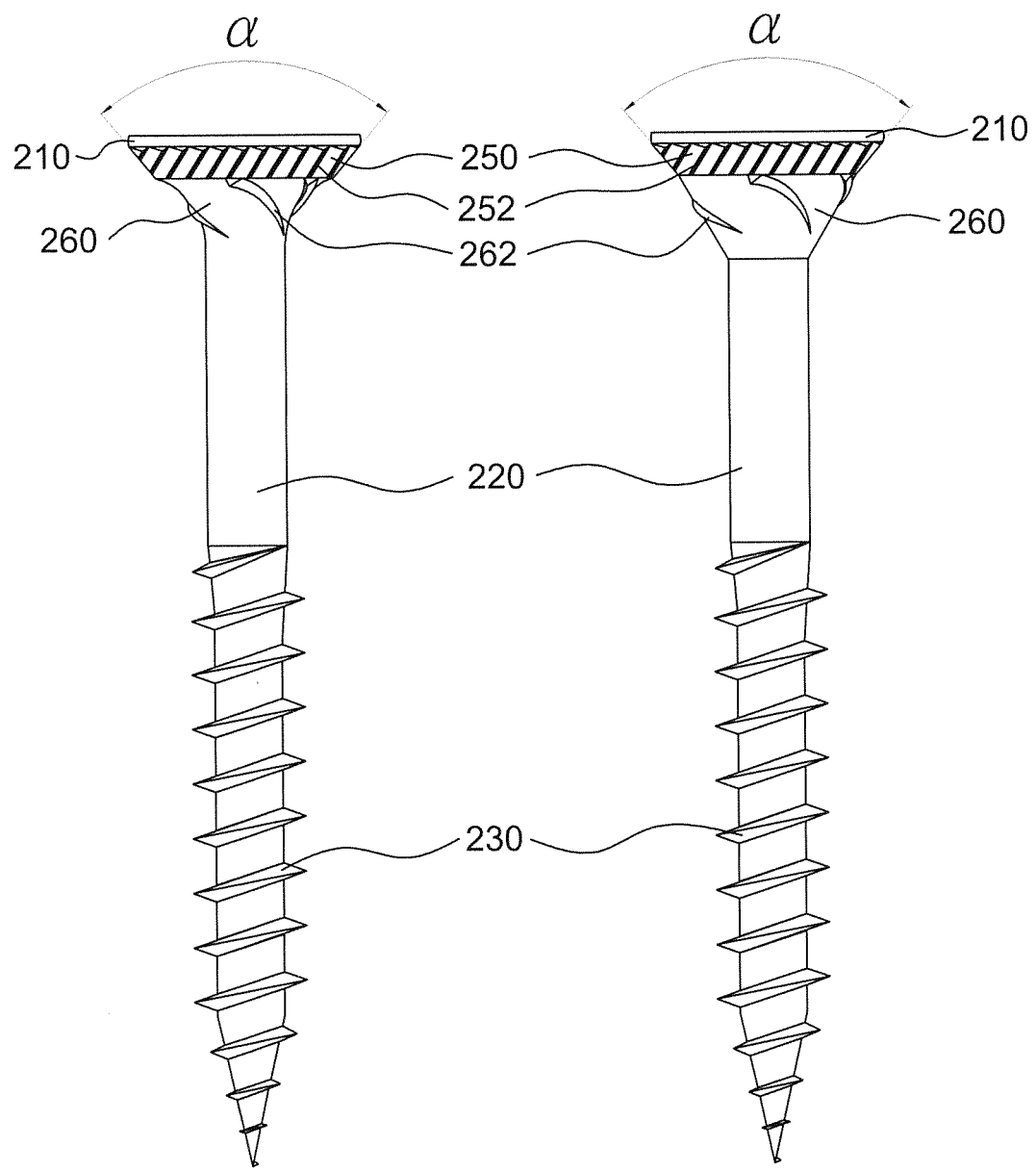
FIG. 10a is a front view of the screw of the present disclosure according to one aspect of the fourth embodiment.
FIG. 10b is a front view of the screw of the present disclosure according to another aspect of the fourth embodiment.
Figures 11A, 11B:
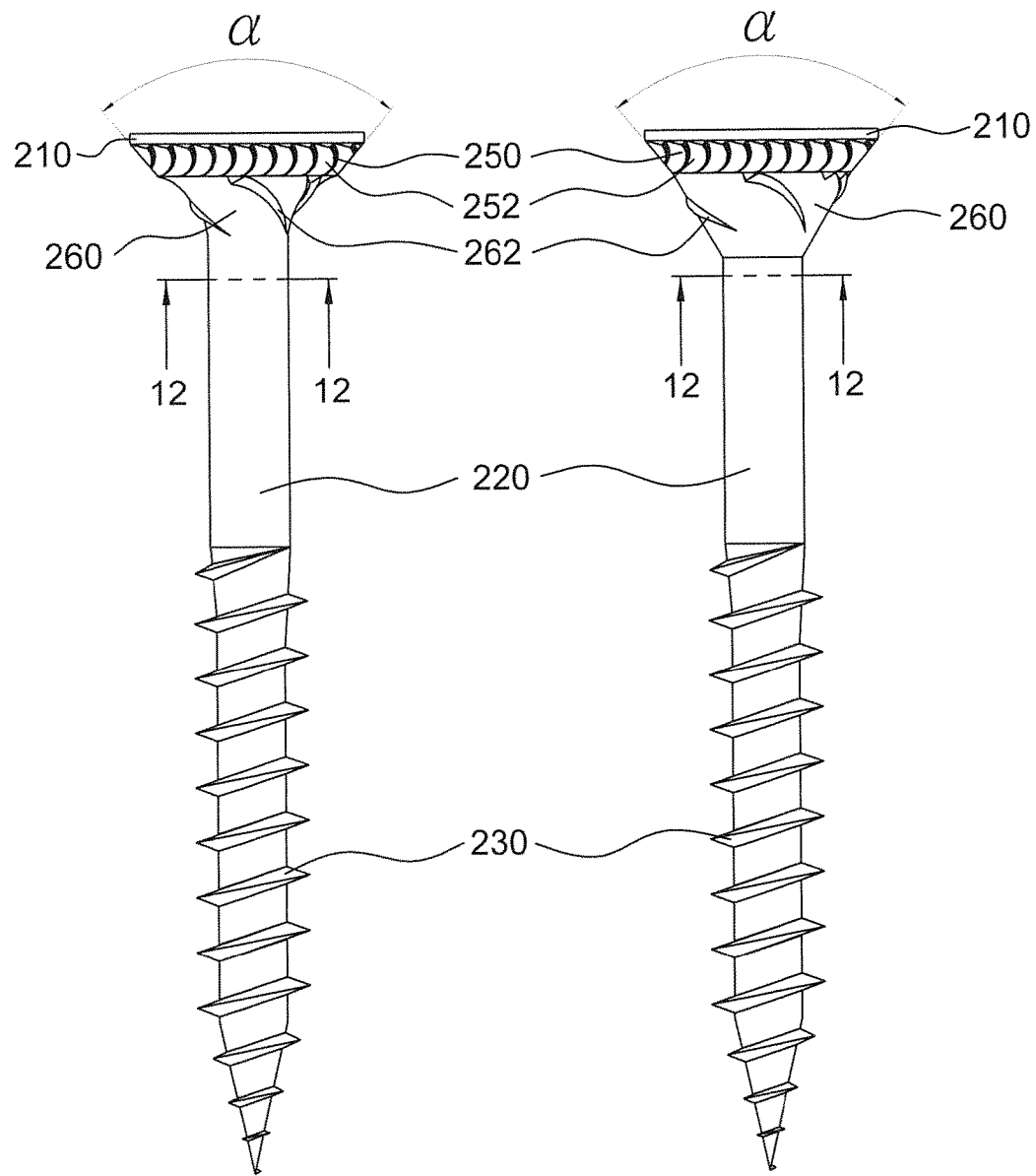
FIG. 11a is a front view of the screw of the present disclosure according to one aspect of the fifth embodiment.
FIG. 11b is a front view of the screw of the present disclosure according to another aspect of the fifth embodiment.
Figures 13A, 13B:
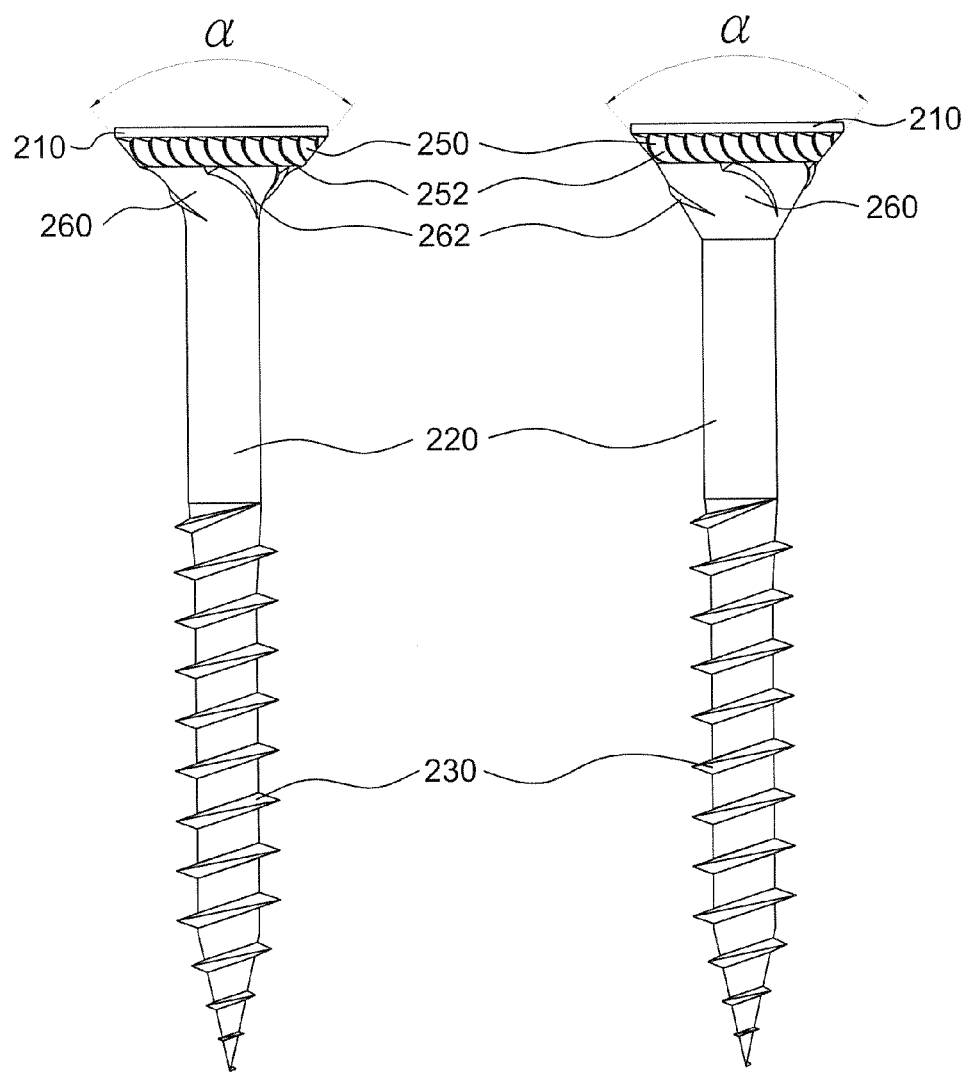
FIG. 13a is a front view of the screw of the present disclosure according to one aspect of the sixth embodiment.
FIG. 13b is a front view of the screw of the present disclosure according to another aspect of the sixth embodiment.
Figures 14A, 14B:
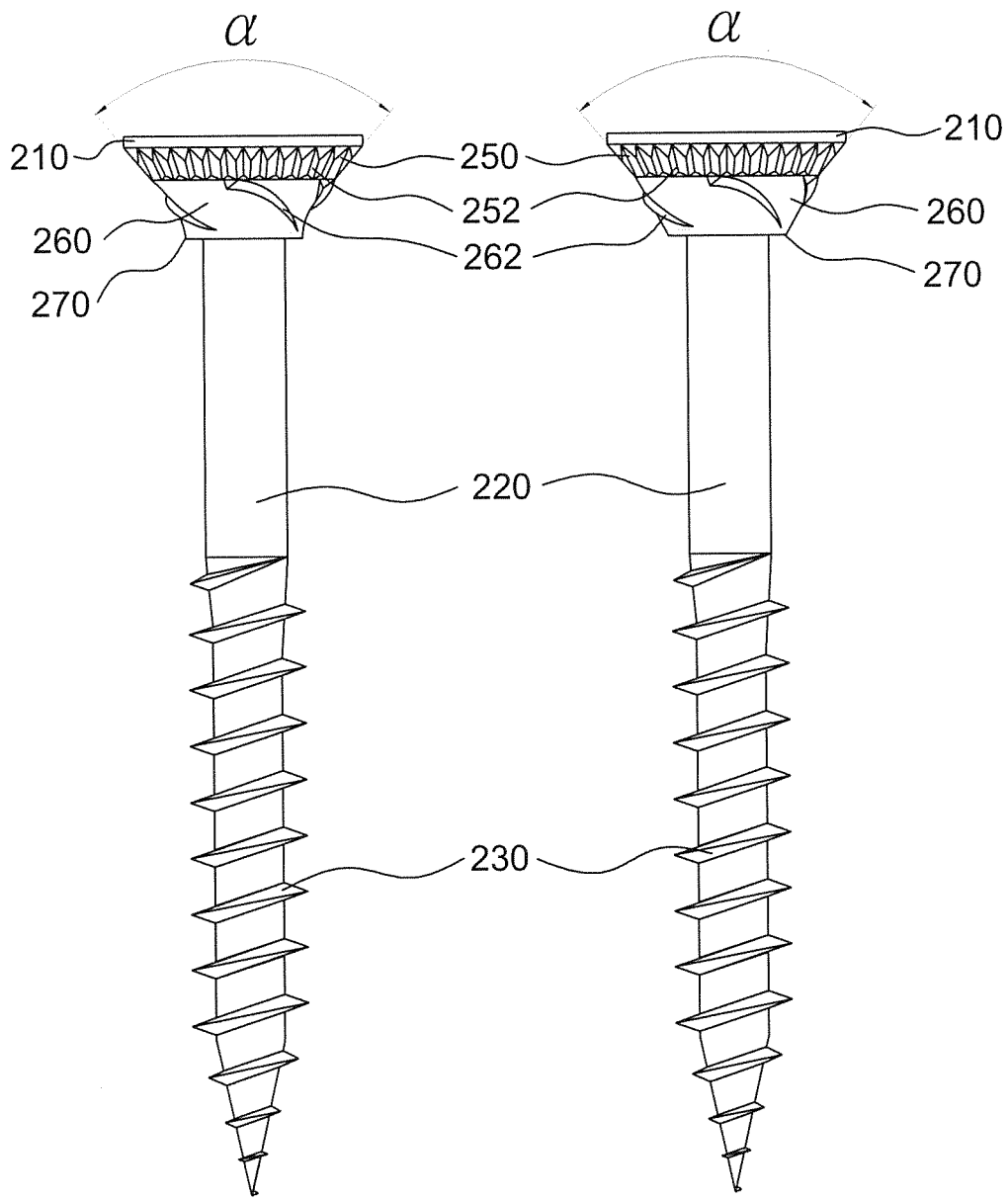
FIG. 14a is a front view of the screw of the present disclosure according to one aspect of the seventh embodiment.
FIG. 14b is a front view of the screw of the present disclosure according to another aspect of the seventh embodiment.
Figures 15A, 15B:
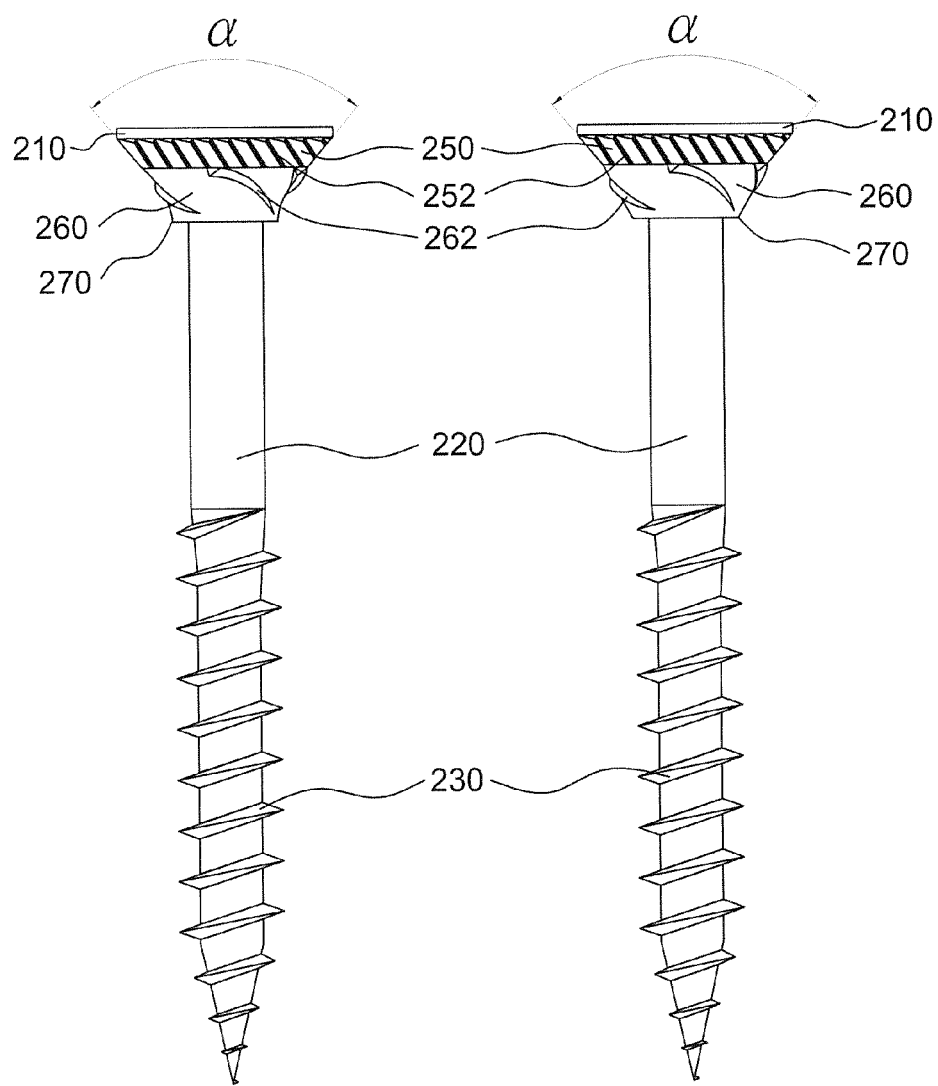
FIG. 15a is a front view of the screw of the present disclosure according to one aspect of the eighth embodiment.
FIG. 15b is a front view of the screw of the present disclosure according to another aspect of the eighth embodiment.
Figures 16A, 16B:
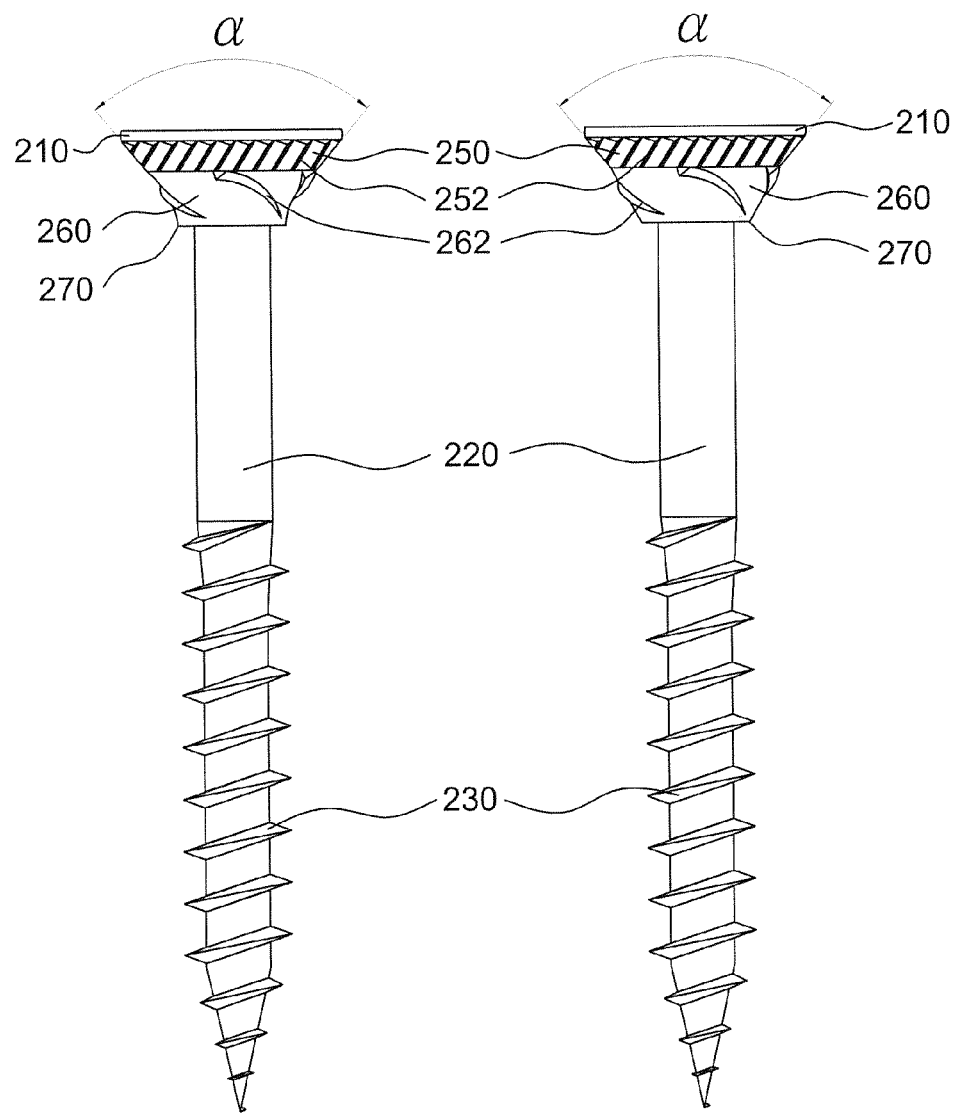
FIG. 16a is a front view of the screw of the present disclosure according to one aspect of the ninth embodiment.
FIG. 16b is a front view of the screw of the present disclosure according to another aspect of the ninth embodiment.
Figures 17A, 17B:
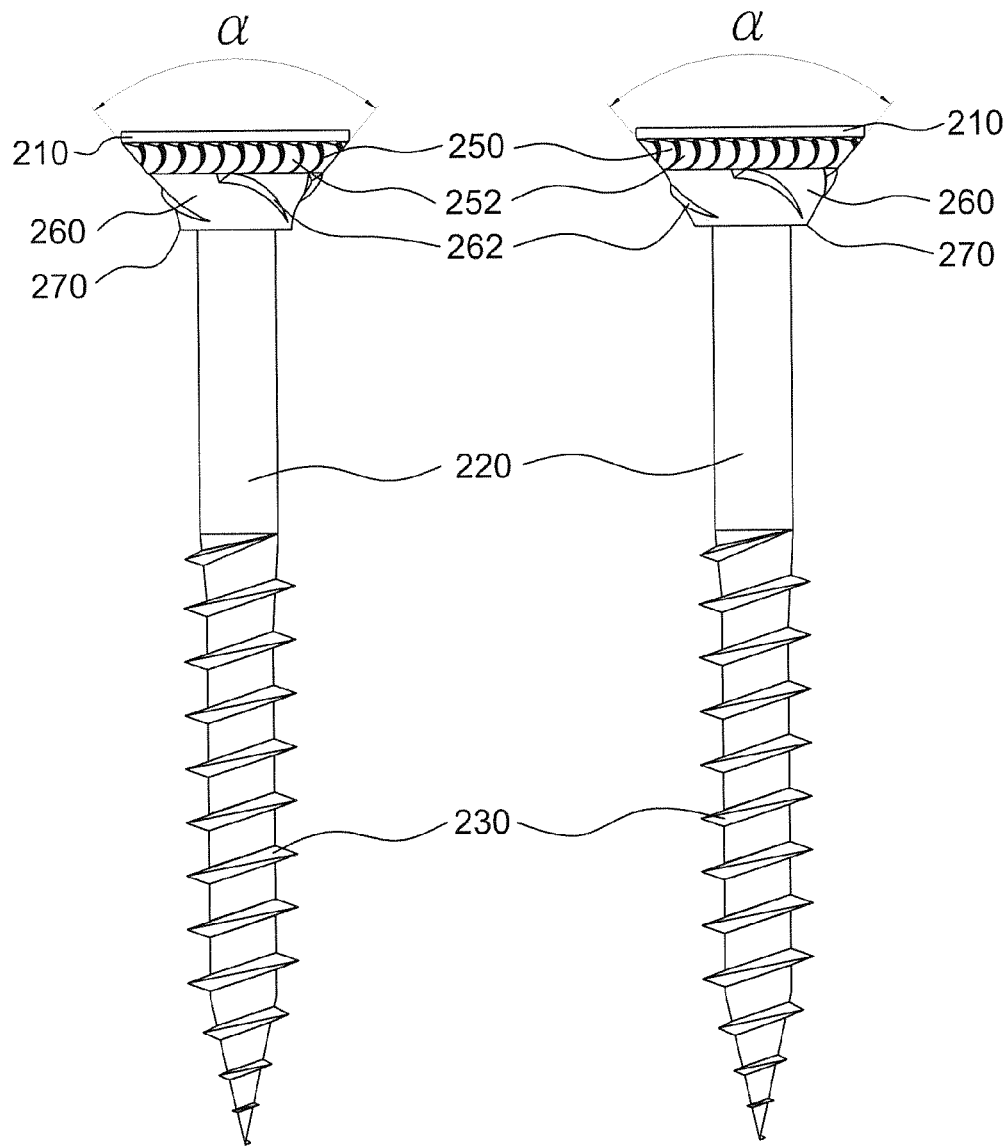
FIG. 17a is a front view of the screw of the present disclosure according to one aspect of the tenth embodiment.
FIG. 17b is a front view of the screw of the present disclosure according to another aspect of the tenth embodiment.
Figures 18A, 18B:
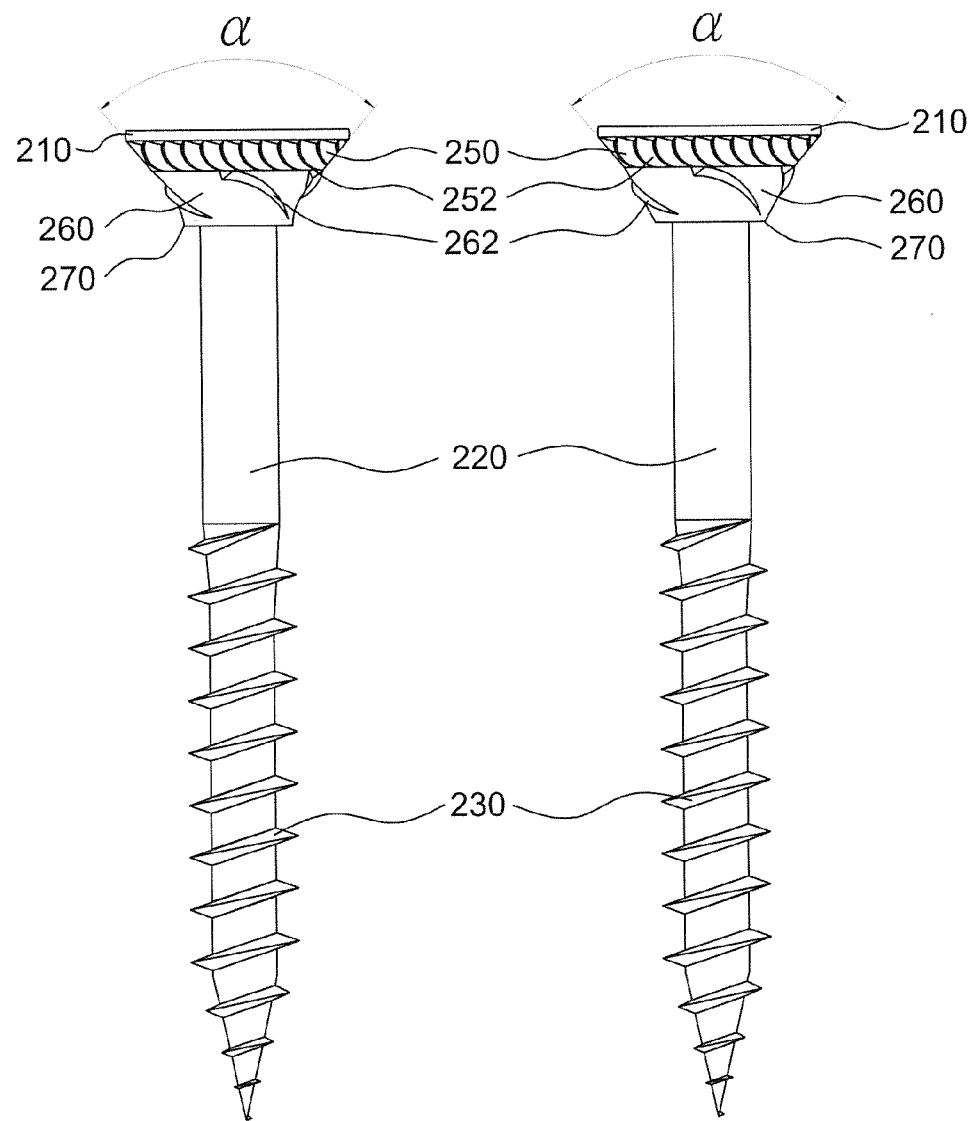
FIG. 18a is a front view of the screw of the present disclosure according to one aspect of the eleventh embodiment.
FIG. 18b is a front view of the screw of the present disclosure according to another aspect of the eleventh embodiment.
Figures 19A, 19B:
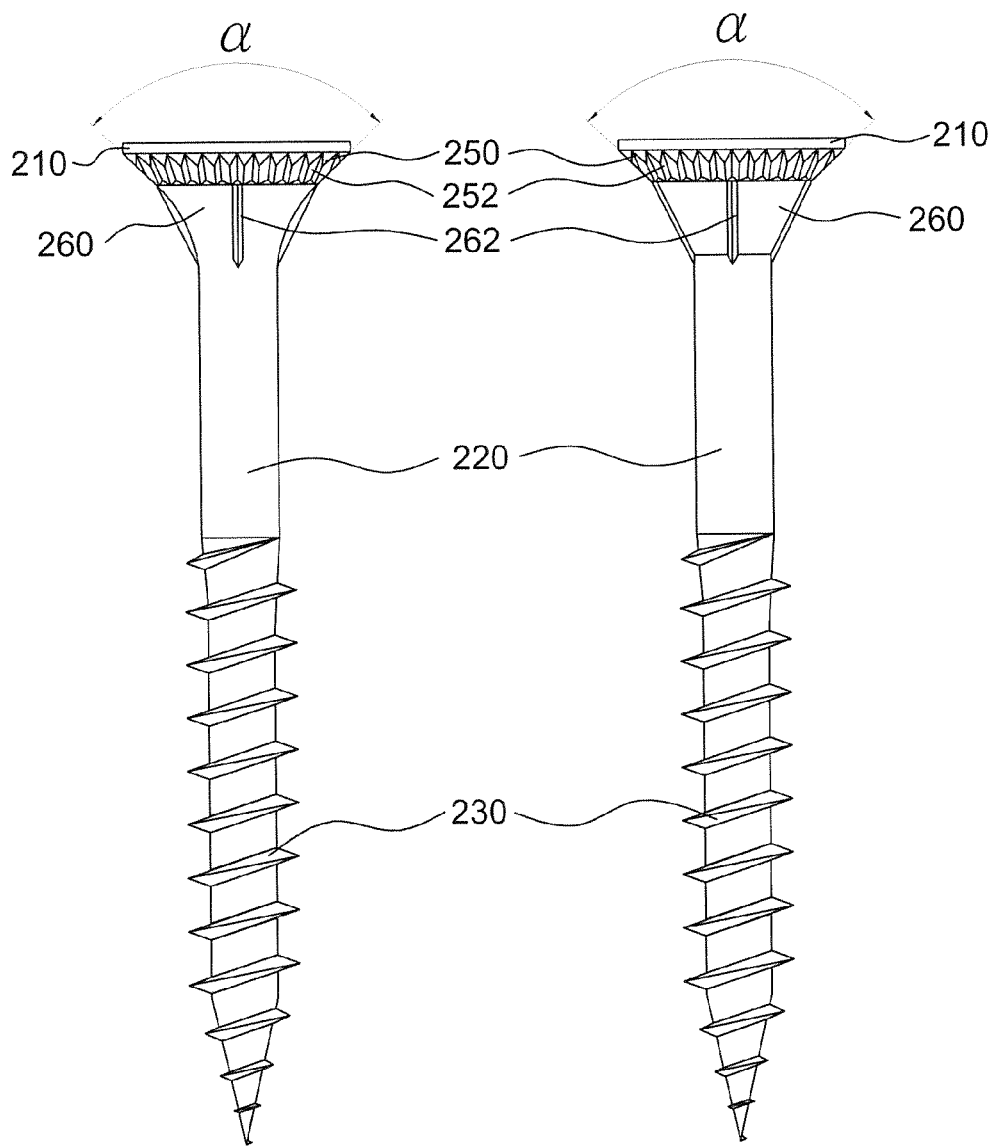
FIG. 19a is a front view of the screw of the present disclosure according to one aspect of the twelfth embodiment.
FIG. 19b is a front view of the screw of the present disclosure according to another aspect of the twelfth embodiment.
Figures 20A, 20B:
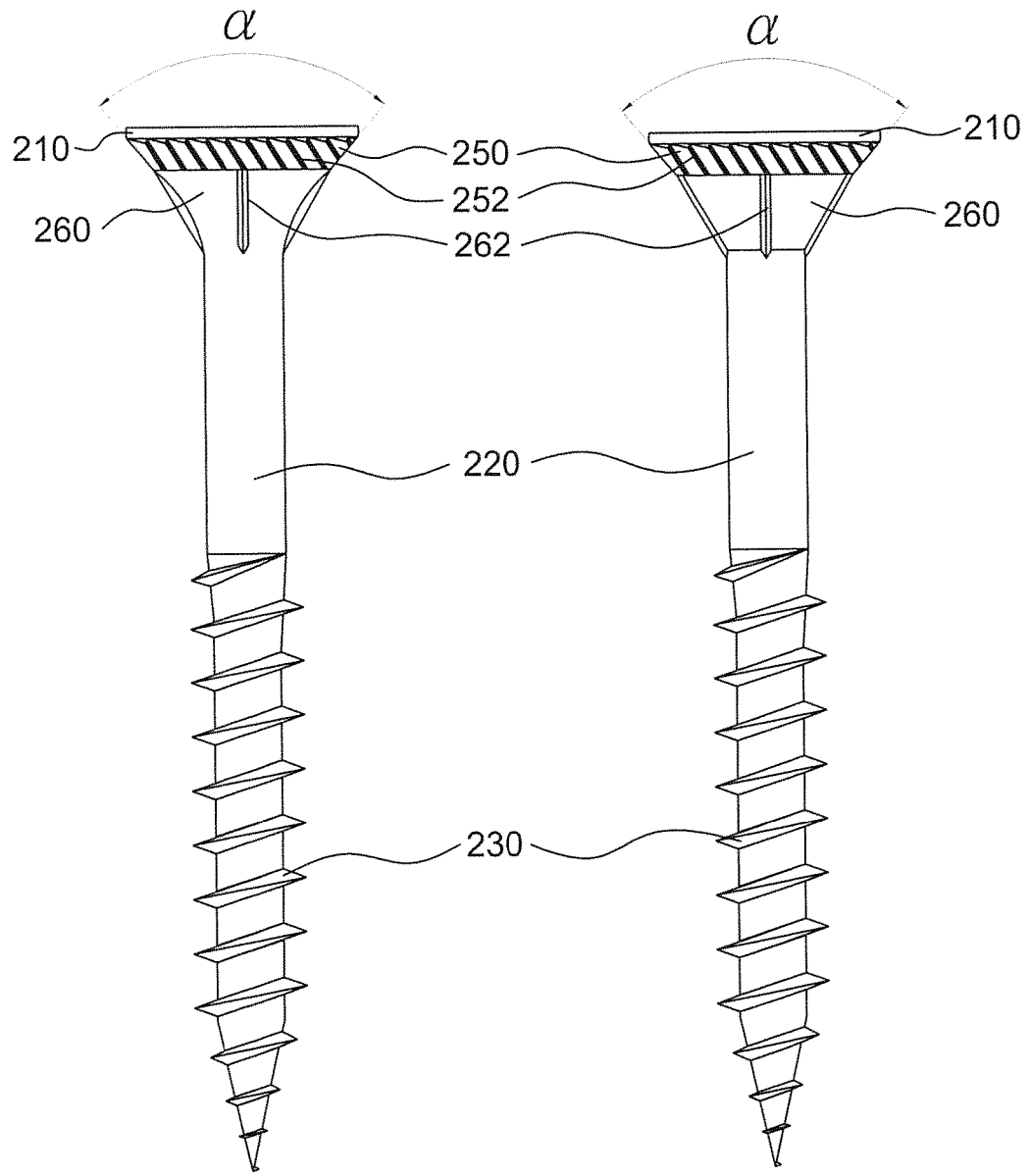
FIG. 20a is a front view of the screw of the present disclosure according to one aspect of the thirteenth embodiment.
FIG. 20b is a front view of the screw of the present disclosure according to another aspect of the thirteenth embodiment.
Figures 21A, 21B:
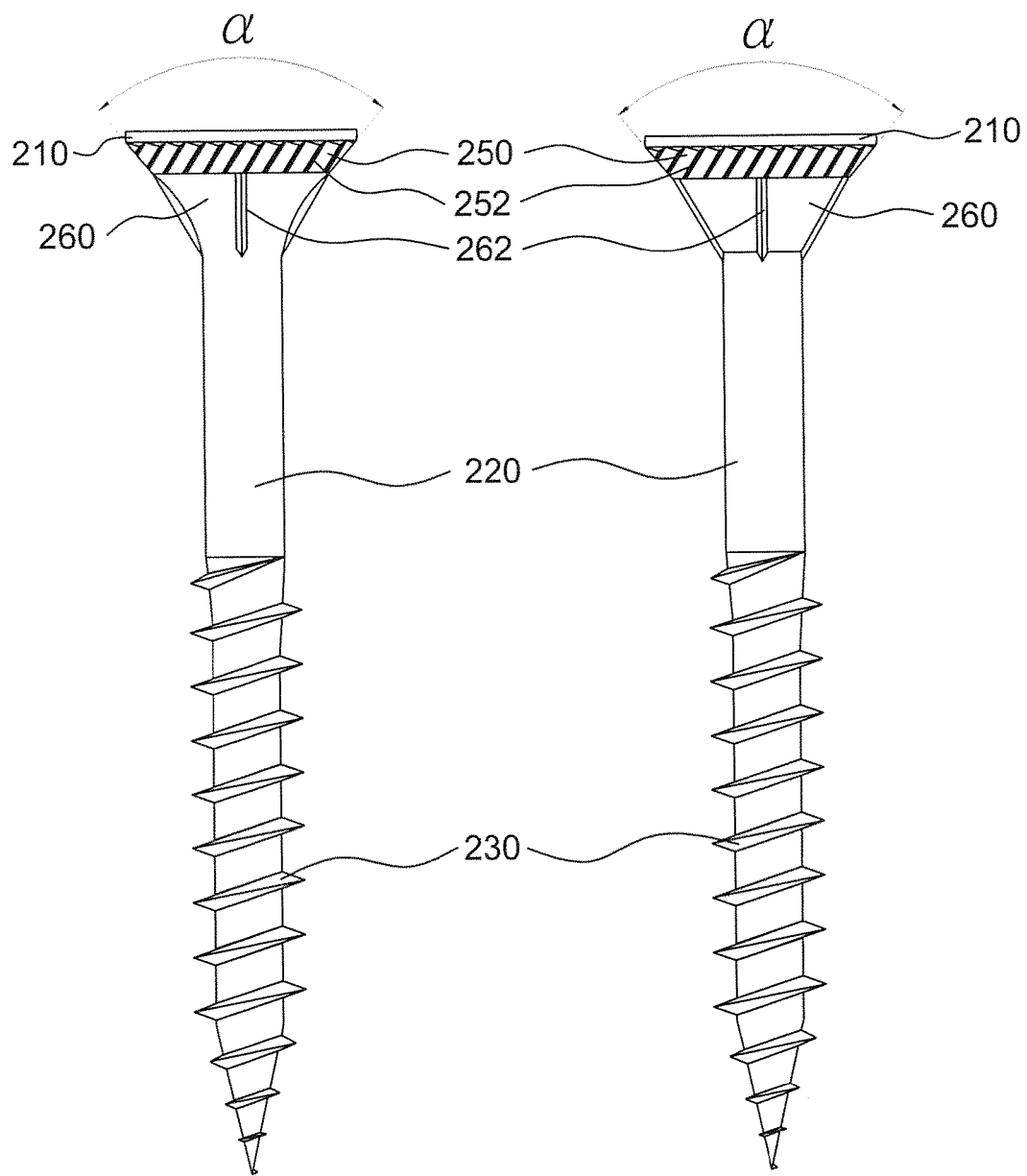
FIG. 21a is a front view of the screw of the present disclosure according to one aspect of the fourteenth embodiment.
FIG. 21b is a front view of the screw of the present disclosure according to another aspect of the fourteenth embodiment.
Figures 22A, 22B:
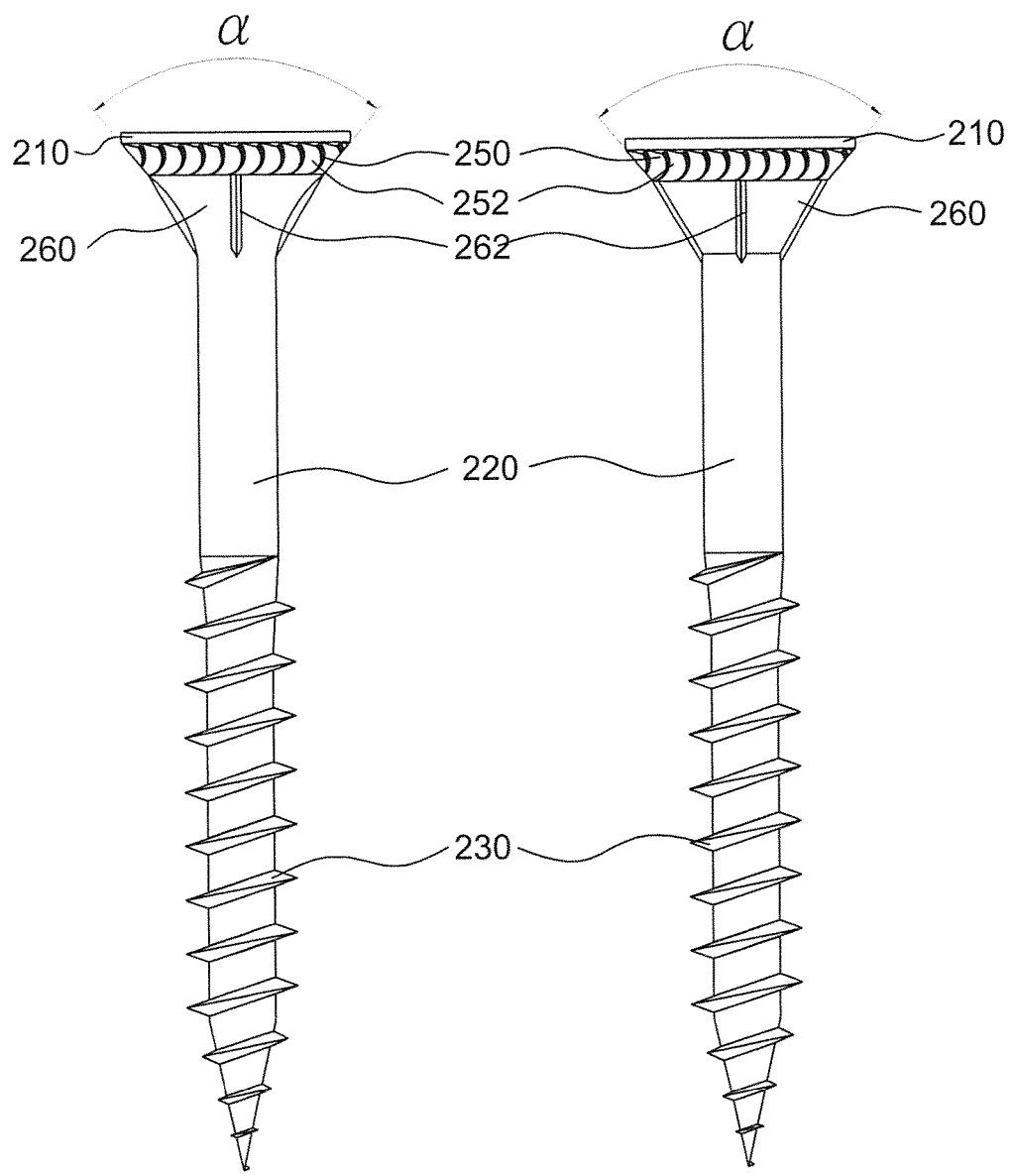
FIG. 22a is a front view of the screw of the present disclosure according to one aspect of the fifteenth embodiment.
FIG. 22b is a front view of the screw of the present disclosure according to another aspect of the fifteenth embodiment.
Figures 23A, 23B:
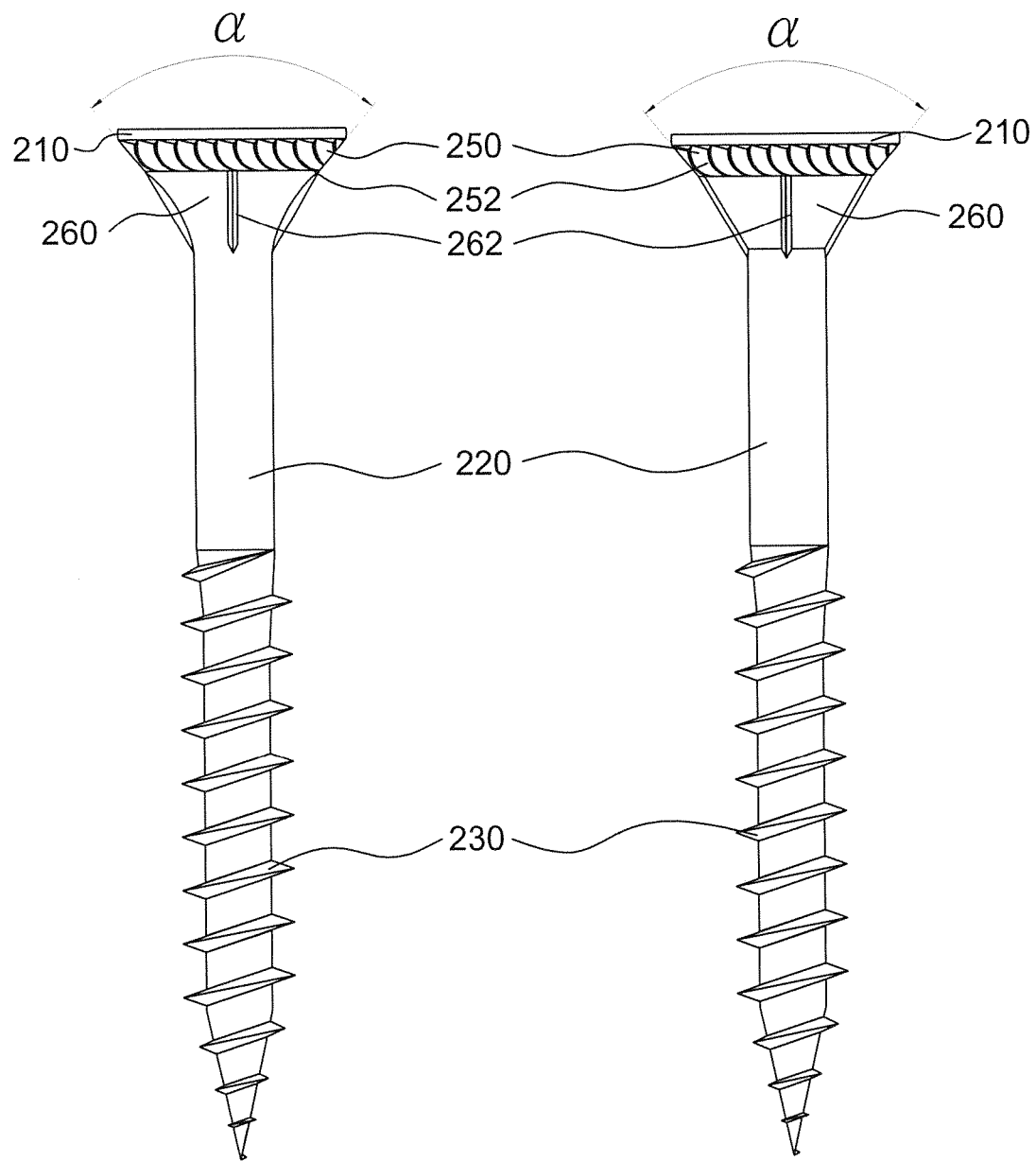
FIG. 23a is a front view of the screw of the present disclosure according to one aspect of the sixteenth embodiment.
FIG. 23b is a front view of the screw of the present disclosure according to another aspect of the sixteenth embodiment.
Figures 24A, 24B:
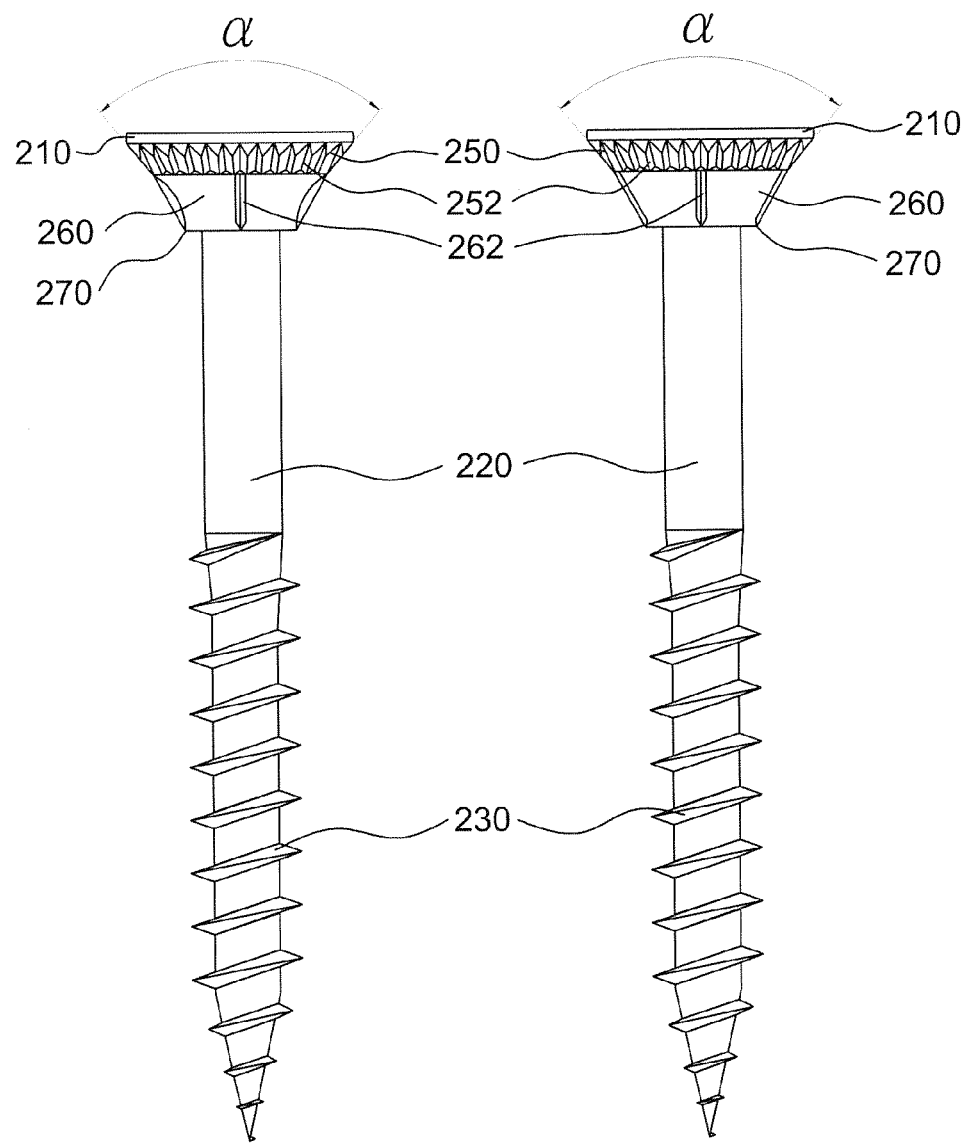
FIG. 24a is a front view of the screw of the present disclosure according to one aspect of the seventeenth embodiment.
FIG. 24b is a front view of the screw of the present disclosure according to another aspect of the seventeenth embodiment.
Figures 25A, 25B:
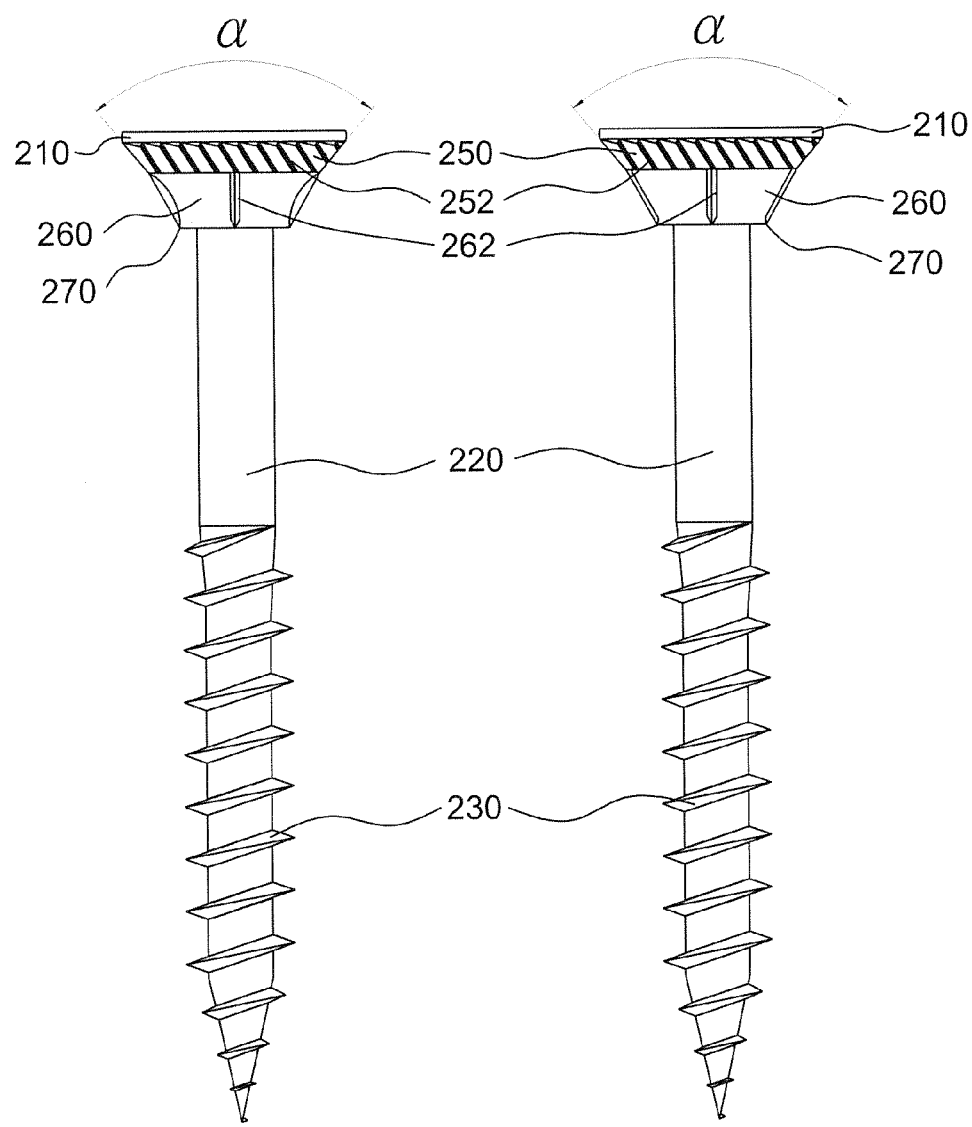
FIG. 25a is a front view of the screw of the present disclosure according to one aspect of the eighteenth embodiment.
FIG. 25b is a front view of the screw of the present disclosure according to another aspect of the eighteenth embodiment.
Figures 26A, 26B:
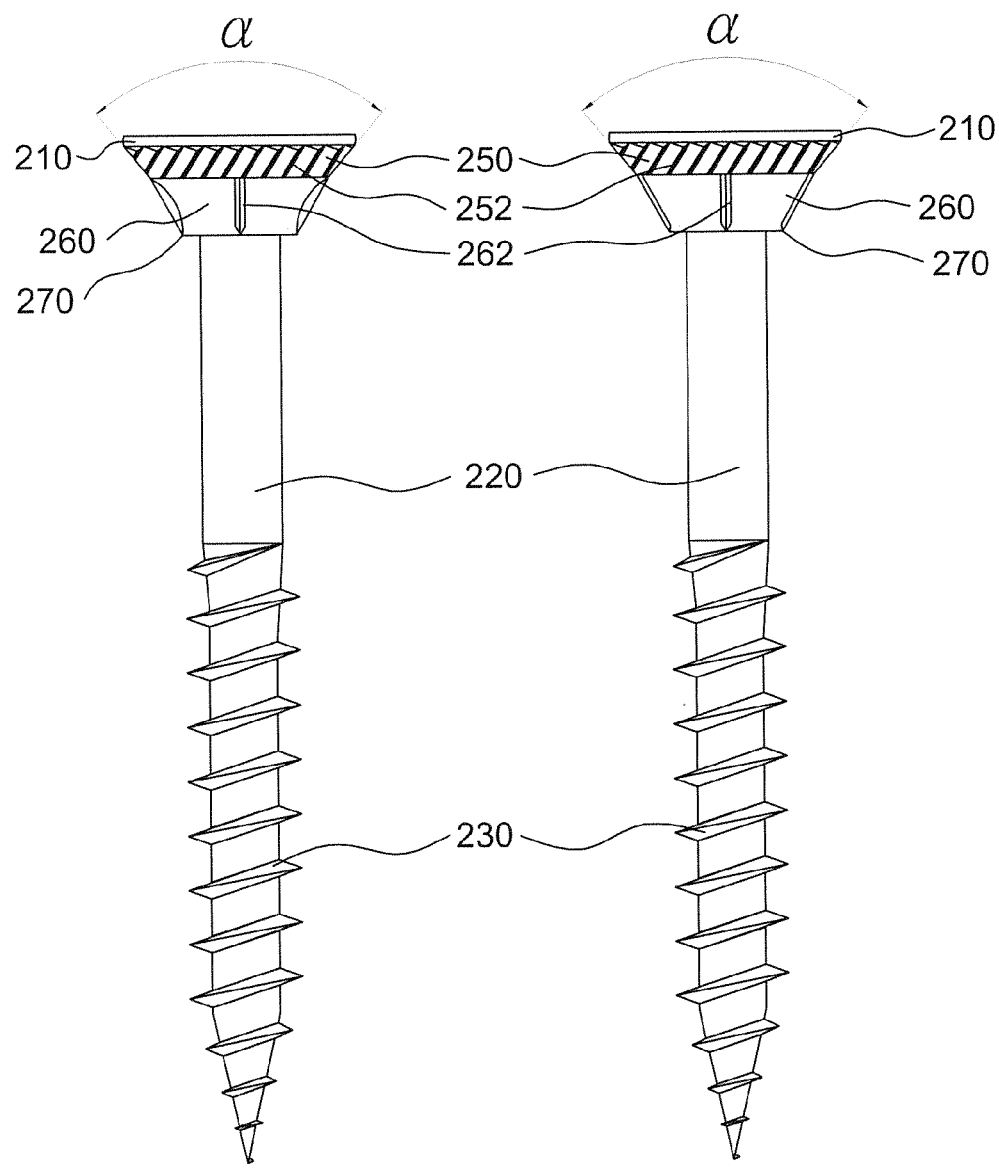
FIG. 26a is a front view of the screw of the present disclosure according to one aspect of the nineteenth embodiment.
FIG. 26b is a front view of the screw of the present disclosure according to another aspect of the nineteenth embodiment.
Figures 27A, 27B:
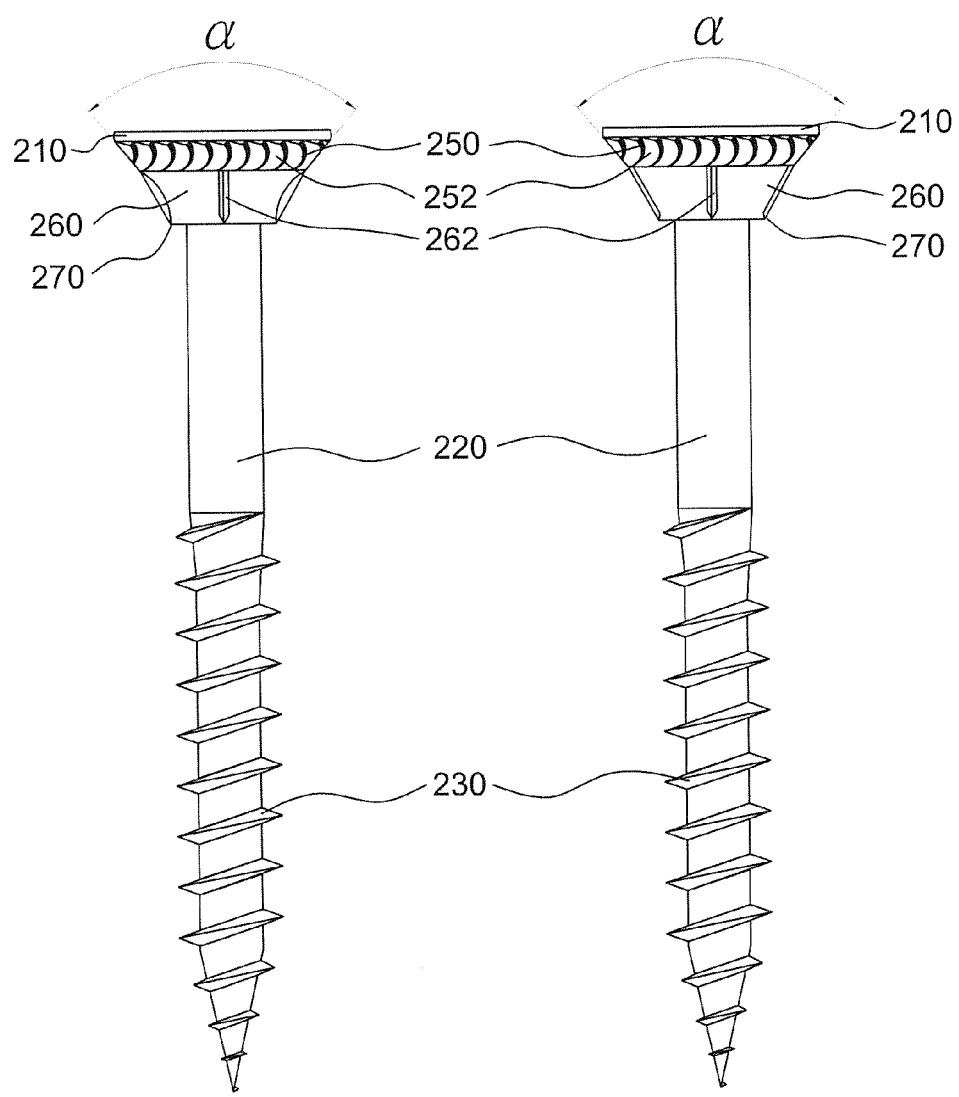
FIG. 27a is a front view of the screw of the present disclosure according to one aspect of the twentieth embodiment.
FIG. 27b is a front view of the screw of the present disclosure according to another aspect of the twentieth embodiment.
Figures 28A, 28B:
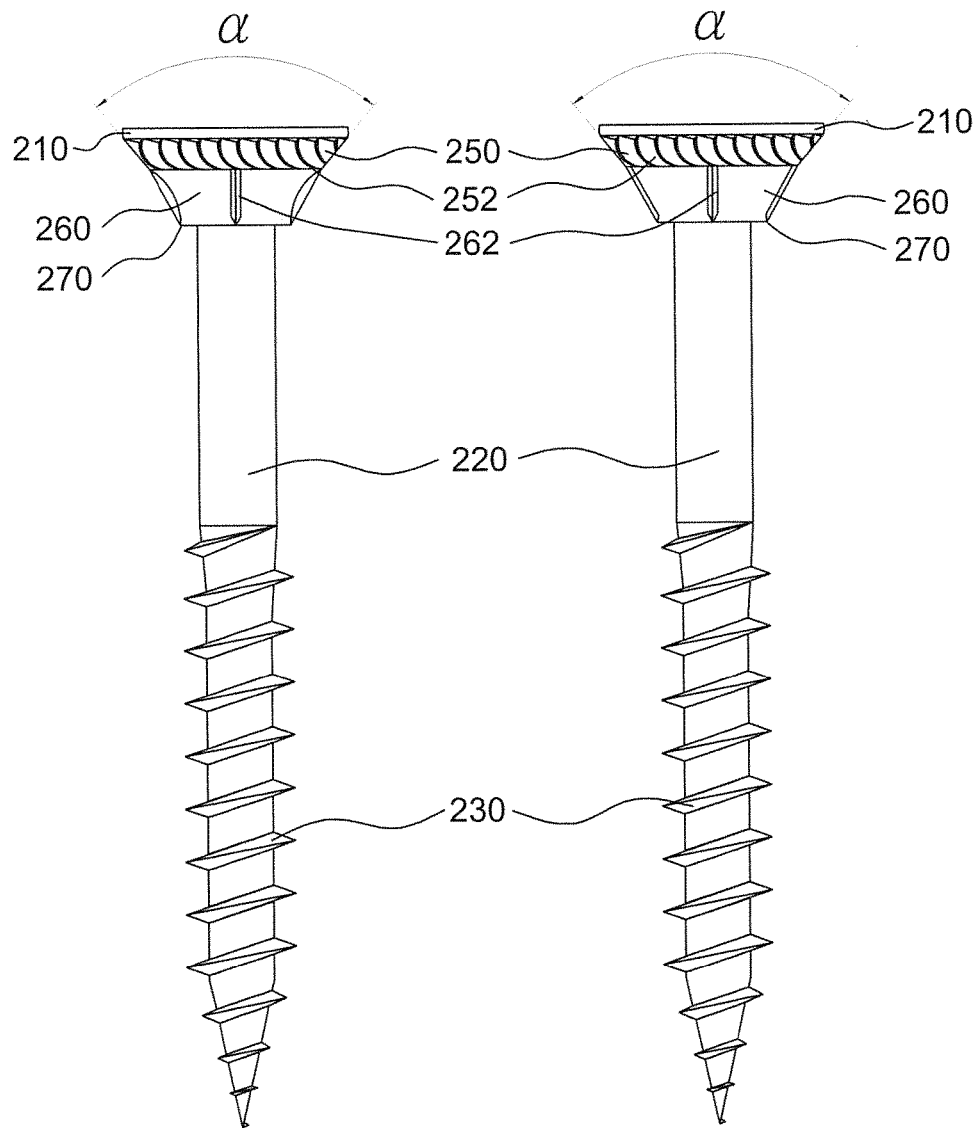
FIG. 28a is a front view of the screw of the present disclosure according to one aspect of the twenty-first embodiment.
FIG. 28b is a front view of the screw of the present disclosure according to another aspect of the twenty-first embodiment.

Reference is made to FIGS. 4a to 28b, which illustrate different screws according to different embodiments of the present disclosure. In these figures, identical reference numerals have been used when designating substantially identical elements that are common to the figures. Each of the screws of the present disclosure includes a flat head 210 and a shank 220. The head 210 is configured to receive a fastening tool. The shank 220 extends downward from the head 210. A thread 230 is formed on the shank 220, which may engage with the workpiece to be fastened, such as soft wood, hard wood, compound material, foamed plastics and synthetic material including recycled plastics, polymer and wood, to provide a resistance to pull-out.

The head 210 is of tapered shape and has tapered side-surfaces, which include a first side surface 250 and a second side surface 260. The second side surface 260 is located between the first side surface 250 and the shank 220. That is, the second side surface 260 is positioned below the first side surface 250 and is closer to the shank 220 than the first side surface 250. The first side surface 250 may be a conical surface. That is, the part of the head 210 surrounded by the first side surface 250 gets narrower uniformly and linearly toward the second side surface 260. Specifically, the part of the head 210 surrounded by the first side surface 250 has a radial diameter perpendicular to the axis of the shank 220, which gets smaller linearly toward the second side surface 260. The conical side-surface 250 therefore defines a rim angle α, which is between 70 to 100 degrees. The second side surface 260 may be a conical surface, as illustrated in FIGS. 4b, 6b, 8b, 10b, 11b, 13b, 14b, 15b, 16b, 17b, 18b, 19b, 20b, 21b, 22b, 23b, 24b, 25b, 26b, 27b and 28b. Alternatively, the second side surface 260 may be a cambered surface, as illustrated in FIGS. 4a, 6a, 8a, 10a, 11a, 13a, 14a, 15a, 16a, 17a, 18a, 19a, 20a, 21a, 22a, 23a, 24a, 25a, 26a, 27a and 28a. There is no step formed at the border between the first and second side surfaces 250, 260. That is, the first side surface 250 smoothly and continuously connects with the second side surface 260. The second side surface 260 may smoothly and continuously connects with the shank 220. Alternatively, there may be a step 270 is formed at the border between the second side surface 260 and the shank 220, as illustrated in FIGS. 14a to 18b and 24a to 28b. When the second side surface 260 is a conical surface, it means that the part of the head 210 surrounded by the second side surface 260 has a radial diameter perpendicular to the axis of the shank 220 that gets smaller linearly toward the shank 220. When the second side surface 260 is a cambered surface, it indicates that the part of the head 210 surrounded by the second side surface 260 is of trumpet shape and has a decreasing rate of the radial diameter that gets smaller toward the shank 220. That is, the part of the head 210 surrounded by the upper portion of the second side surface 260 gets narrower more rapid toward the shank 220 than the part of the head 210 surrounded by the lower portion of the second side surface 260 does. Similarly, the first side surface 250 may also be a cambered surface.

A plurality of first ribs 252 is equally positioned on the first side surface 250. The first ribs 252 may be longitudinal ribs (as illustrated in FIGS. 4a to 7f, 14a, 14b, 19a, 19b, 24a and 24b), skew ribs (as illustrated in FIGS. 8a to 10b, 15a to 16b, 20a to 21b and 25a to 26b) or curved ribs (as illustrated in FIGS. 11a to 13b, 17a to 18b, 22a to 23b and 27a to 28b). When the first rib 252 is a longitudinal rib, it indicates that the first rib 252 extends straight from one end to the other end and is substantially parallel to the lengthwise direction of the shank 220. When the first rib 252 is a skew rib, it indicates that the first rib 252 also extends straight from one end to the other end but is inclined to the lengthwise direction of the shank 220. The skew rib 252 may extend substantially in the spiral direction of the thread 230, as shown in FIGS. 10a, 10b, 16a, 16b, 21a, 21b, 26a and 26b. The skew rib 252 may also extend in a direction substantially opposite to the spiral direction of the thread 230, as shown in FIGS. 8a, 8b, 9a to 9f, 15a, 15b, 20a, 20b, 25a and 25b. Similarly, the curved rib 252 may spiral in the spiral direction of the thread 230, as shown in FIGS. 13a, 13b, 18a, 18b, 23a, 23b, 28a and 28b. The curved rib 252 may also spiral in a direction opposite to the spiral direction of the thread 230, as shown in FIGS. 11a, 11b, 12a to 12f, 17a, 17b, 22a, 22b, 27a and 27b. The first rib 252 may have a bilateral symmetry about the lengthwise direction thereof. Alternatively, the first rib 252 may be asymmetrical.

Figure 29A:
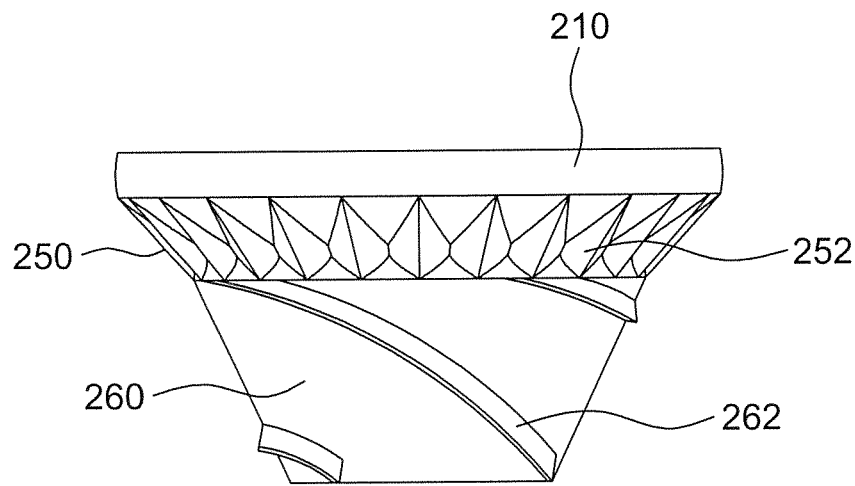
FIG. 29a is a side view of the heads of the screws according to some of the embodiments of the present disclosure.
Figure 29B:
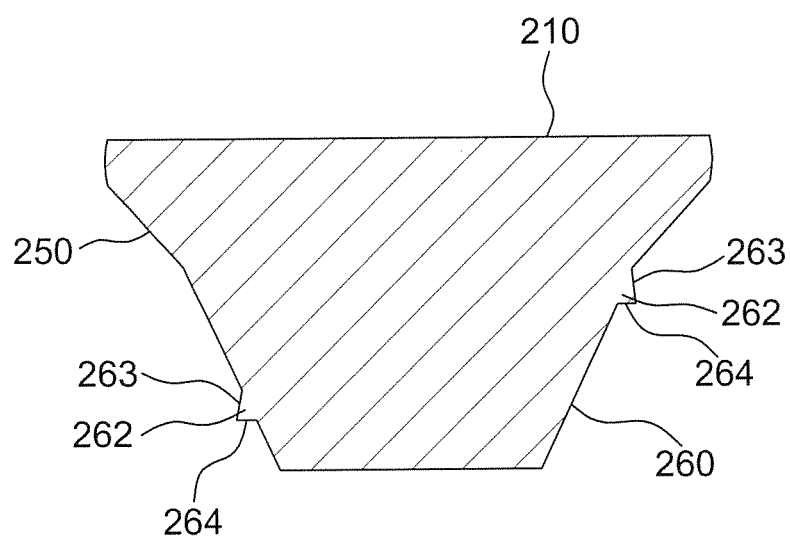
FIG. 29b is a cross-sectional view of the heads of the screws according to some of the embodiments of the present disclosure.

At least one second rib 262 is equally positioned on the second side surface 260. The number of the at least one second rib 262 may be between 1 and 12. The second ribs 262 may be curved ribs (as illustrated in FIGS. 4a to 18b) or longitudinal ribs (as illustrated in FIGS. 19a to 28b), all of which extend from the borders between the first and second side surfaces 250, 260 to the borders between the second side surfaces 260 and shanks 220. The second rib 262 may connect or disconnect with one of the first ribs 252. When the second rib 262 is a curved rib, it extends for less than one turn. This indicates that the curved rib 262 spirals for less than 360 degrees. The curved rib 262 may spiral in the spiral direction of the thread 230, as shown in FIGS. 6a, 6b and 7a to 7f. The curved rib 262 may also spiral in a direction opposite to the spiral direction of the thread 230, as shown in FIGS. 4a to 5f and 8a to 18b. The second rib 262 may have a bilateral symmetry about the lengthwise direction thereof. Alternatively, the second rib 262 may be asymmetrical. Reference is now made to FIGS. 29a and 29b, when the second rib 262 is curved and has no bilateral symmetry, it may have opposing inner lateral wall 264 and outer lateral wall 263. The inner lateral wall 264 faces the shank 220 and is positioned between the shank 220 and the outer lateral wall 263, wherein the length of the outer lateral wall 263 is different from that of the inner later wall 264.

When the screws of the present disclosure are used to fasten to a workpiece, the heads 210 are driven to rotate with fastening tools. The second ribs 262 on the second side surfaces 260 will rotate to cut the workpiece and then the first ribs 252 on the first side surfaces 250 keep cutting the workpiece. In addition, the first ribs 252 may also press the bulges and the chips cut from the workpiece in the workpiece. Therefore, the workpiece to be fastened will not exhibit evident bulges, cracks or burrs surrounding the heads 210 when the heads 210 are countersunk into the workpiece. Further, the inner lateral walls 264 of the curved second ribs 262 are almost parallel to the axes of the shanks 220 respectively, and therefore have good performance in cutting. Accordingly, the workpiece to be fastened will not exhibit evident burrs.

When the screws of the present disclosure have steps 270 formed at the borders between the second side surfaces 260 and the shanks 220, as illustrated in FIGS. 14a to 18b and 24a to 28b, the steps 270 may have sharp edges to help to quickly cut the workpiece.

According to the screws of the present disclosure, they are also suitable for fastening hardware accessories such as hinges provided with fastening holes. When the screws are drilled into the workpiece through the fastening holes of the hardware accessories and the heads 210 are countersunk into the workpiece, the side surfaces of the heads 210 may be in tight contact with the inner walls of the fastening holes since these side surfaces are tapered and smooth.

According to the screws of the present disclosure, both the ribs on the first and second side surfaces may cut the workpiece. In addition, the first ribs may also press the bulges and the chips cut from the workpiece in the workpiece. Therefore, the workpiece to be fastened will not exhibit evident bulges, cracks, burrs or twisted grains surrounding the screw heads when the screw heads are countersunk into the workpiece. The screws of the present disclosure may also prevent the fastened workpiece from cracking arising from stress concentration and climate influences such as thermal expansion and contraction, moisture absorption, and drying after moisture absorption when the screws have been fastened to the workpiece for a long time. The screws of the present disclosure may fasten the workpiece securely and be used safely, as well as keep the workpiece good appearance accordingly. In addition, there is no need to pre-drill an enlarged hole on the workpiece in order to solve the conventional problems.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A screw, comprising:
   a shank defining a lengthwise direction;
   a thread formed on the shank;
   a head formed at one end of the shank, the head being configured to receive a fastening tool, the head having tapered side surfaces including a first side surface and a second side surface, wherein the second side surface is located between the first side surface and the shank;
   a plurality of first ribs positioned on the first side surface; and
   at least one second rib positioned on the second side surface, the at least one second rib curving in an arc shape and extending from a first end toward the shank to a second end, wherein the at least one second rib tapers from the first end to the second end, the at least one second rib having a width that gradually becomes smaller when extending from the first end toward the second end, the at least one second rib having a height that gradually becomes smaller when extending from the first end toward the second end.

2. The screw as claimed in claim 1, wherein the at least one second rib extends from a border between the first side surface and the second side surface to another border between the second side surface and the shank.

3. The screw as claimed in claim 1, wherein the first side surface is a conical surface or cambered surface.

4. The screw as claimed in claim 1, wherein the first side surface is a conical surface that defines a rim angle ranged from 70 to 100 degrees.

5. The screw as claimed in claim 1, wherein the first ribs are longitudinal ribs, skew ribs or curved ribs.

6. The screw as claimed in claim 1, wherein the second side surface is a conical surface or cambered surface.

7. The screw as claimed in claim 1, further comprising:
   a step formed at a border between the second side surface and the shank.

8. The screw as claimed in claim 1, wherein the screw is free of including a step formed at a border between the first side surface and the second side surface.

9. The screw as claimed in claim 1, wherein the at least one second rib extends for less than one turn.

10. The screw as claimed in claim 1, wherein the first ribs have bilaterally symmetrical shapes.

11. The screw as claimed in claim 1, wherein the first ribs have asymmetrical shapes.

12. The screw as claimed in claim 1, wherein the at least one second rib has a bilaterally symmetrical shape.

13. The screw as claimed in claim 1, wherein the at least one second rib has an asymmetrical shape.

* * * * *